(12) United States Patent
Terada et al.

(10) Patent No.: US 8,892,033 B2
(45) Date of Patent: Nov. 18, 2014

(54) WIRELESS POWER TRANSMISSION SYSTEM, TRANSMITTER, AND RECEIVER

(75) Inventors: Takahide Terada, Tokyo (JP); Hiroshi Shinoda, Kodaira (JP); Keisuke Yamamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 13/314,934

(22) Filed: Dec. 8, 2011

(65) Prior Publication Data

US 2012/0149307 A1 Jun. 14, 2012

(30) Foreign Application Priority Data

Dec. 10, 2010 (JP) ................................. 2010-276099

(51) Int. Cl.
H04B 5/00 (2006.01)
H02J 7/02 (2006.01)

(52) U.S. Cl.
CPC .............. *H04B 5/0037* (2013.01); *H02J 7/025* (2013.01); *Y02B 60/50* (2013.01)
USPC ....................................................... 455/41.1

(58) Field of Classification Search
None
See application file for complete search history.

(56) References Cited

U.S. PATENT DOCUMENTS

| | | | | |
|---|---|---|---|---|
| 6,049,249 A * | 4/2000 | Tammaru et al. | ................ | 330/43 |
| 7,068,991 B2 * | 6/2006 | Parise | ......................... | 455/343.1 |
| 7,522,014 B2 * | 4/2009 | Koriyama | ........................ | 333/26 |
| 7,825,543 B2 * | 11/2010 | Karalis et al. | .................. | 307/104 |
| 8,129,864 B2 * | 3/2012 | Baarman et al. | .............. | 307/104 |
| 8,344,552 B2 * | 1/2013 | Cook et al. | ..................... | 307/104 |
| 8,427,330 B2 * | 4/2013 | Vorenkamp et al. | ........ | 340/636.2 |
| 8,466,660 B2 * | 6/2013 | Iizuka et al. | ................... | 320/137 |
| 2008/0238796 A1 * | 10/2008 | Rofougaran | .................... | 343/776 |
| 2010/0013322 A1 * | 1/2010 | Sogabe et al. | ................ | 307/104 |
| 2010/0181961 A1 * | 7/2010 | Novak et al. | ................... | 320/108 |
| 2010/0201313 A1 * | 8/2010 | Vorenkamp et al. | ........... | 320/108 |

FOREIGN PATENT DOCUMENTS

| | | |
|---|---|---|
| JP | 2009-278331 A | 11/2009 |
| JP | 2010-51137 A | 3/2010 |

OTHER PUBLICATIONS

Kunsun Eom and Arai Hiroyuk, "Flexible Sheet-shaped Waveguide for Body-centric Wireless Communication", Proceedings of the 2010 IEEE conference on Radio and wireless symposium, ISBN: 978-1-4244-4725-1.*
Kunsun Eom and Arai Hiroyuk, "Wirelss Power Transfer Using Sheet-Like Waveguide", Mar. 23-27, 2009, The 3rd European Conference on Antennas and Propagation, Berlin, Germany.*
Kunsun Eom and Arai Hiroyuk, "Sheetlike Waveguide for 2.4 GHz and 5 GHz Bands", Electronics and Telecommunications Research Institute, ETRI Journal, vol. 32, No. 1, Feb. 2010.*

* cited by examiner

*Primary Examiner* — Lewis West
(74) *Attorney, Agent, or Firm* — Crowell & Moring LLP

(57) ABSTRACT

A wireless power transmission system includes a receiver and a transmitter. The transmitter includes: a power transmission unit that transmits power; a power adjustment unit that adjusts power to be transmitted; and a communication unit. The receiver includes: a power receiving unit that receives power; a power detection unit that detects the received power; a power storage unit that stores the received power; and a communication unit. The power to be transmitted is adjusted on the basis of power transmission efficiency and the remaining energy storage level. The power transmission efficiency is the ratio between the transmitted power and the received power.

18 Claims, 20 Drawing Sheets

FIG. 4A

| POWER TO BE TRANSMITTED | | TRANSMISSION EFFICIENCY $\eta$ | | | | |
|---|---|---|---|---|---|---|
| | | > 80% | > 60% | > 40% | > 20% | 20% TO 0% |
| REMAINING ENERGY STORAGE LEVEL | > 75% | 10 W | 3 W | 0 W | 0 W | 0 W |
| | > 50% | 10 W | 6 W | 3 W | 0 W | 0 W |
| | > 25% | 10 W | 8 W | 6 W | 3 W | 0 W |
| | > 0% | 10 W | 10 W | 10 W | 10 W | 0 W |

FIG. 6A(A)

| POWER TO BE TRANSMITTED | | TRANSMISSION EFFICIENCY | | | | |
|---|---|---|---|---|---|---|
| | | > 90% | > 70% | > 50% | > 30% | 30% TO 0% |
| REMAINING ENERGY STORAGE LEVEL | > 75% | 10 W | 3 W | 0 W | 0 W | 0 W |
| | > 50% | 10 W | 6 W | 3 W | 0 W | 0 W |
| | > 25% | 10 W | 8 W | 6 W | 3 W | 0 W |
| | > 0% | 10 W | 10 W | 10 W | 10 W | 0 W |

FIG. 6A(B)

| POWER TO BE TRANSMITTED | | TRANSMISSION EFFICIENCY | | | | |
|---|---|---|---|---|---|---|
| | | > 70% | > 50% | > 30% | > 20% | 20% TO 0% |
| REMAINING ENERGY STORAGE LEVEL | > 75% | 10 W | 3 W | 0 W | 0 W | 0 W |
| | > 50% | 10 W | 6 W | 3 W | 0 W | 0 W |
| | > 25% | 10 W | 8 W | 6 W | 3 W | 0 W |
| | > 0% | 10 W | 10 W | 10 W | 10 W | 0 W |

FIG. 8(A)

POWER CONSUMPTION = HIGH

| POWER TO BE TRANSMITTED | TRANSMISSION EFFICIENCY | | | | |
|---|---|---|---|---|---|
| | > 80% | > 60% | > 40% | > 20% | 20% TO 0% |
| REMAINING ENERGY STORAGE LEVEL > 75% | 10 W | 3 W | 0 W | 0 W | 0 W |
| > 50% | 10 W | 6 W | 3 W | 0 W | 0 W |
| > 25% | 10 W | 8 W | 6 W | 3 W | 0 W |
| > 0% | 10 W | 10 W | 10 W | 10 W | 0 W |

FIG. 8(B)

POWER CONSUMPTION = LOW

| POWER TO BE TRANSMITTED | TRANSMISSION EFFICIENCY | | | | |
|---|---|---|---|---|---|
| | > 80% | > 60% | > 40% | > 20% | 20% TO 0% |
| REMAINING ENERGY STORAGE LEVEL > 75% | 10 W | 0 W | 0 W | 0 W | 0 W |
| > 50% | 10 W | 3 W | 0 W | 0 W | 0 W |
| > 25% | 10 W | 6 W | 3 W | 0 W | 0 W |
| > 0% | 10 W | 8 W | 6 W | 3 W | 0 W |

FIG. 11

EXAMPLE SETTING OF REQUIRED POWER ON BASIS OF
TRANSMISSION EFFICIENCY AND REMAINING ENERGY STORAGE LEVEL

| REQUIRED POWER | | TRANSMISSION EFFICIENCY | | | | |
|---|---|---|---|---|---|---|
| | | > 80% | > 60% | > 40% | > 20% | 20% TO 0% |
| REMAINING ENERGY STORAGE LEVEL | > 75% | 10 W | 3 W | 0 W | 0 W | 0 W |
| | > 50% | 10 W | 6 W | 3 W | 0 W | 0 W |
| | > 25% | 10 W | 8 W | 6 W | 3 W | 0 W |
| | > 0% | 10 W | 10 W | 10 W | 10 W | 0 W |

WIRELESS POWER TRANSMISSION SYSTEM, TRANSMITTER, AND RECEIVER

CLAIM OF PRIORITY

The present application claims priority from Japanese patent application JP 2010-276099 filed on Dec. 10, 2010, the content of which is hereby incorporated by reference into this application.

FIELD OF THE INVENTION

The present invention relates to a wireless power transmission system, a transmitter, and a receiver. In particular, the invention relates to a wireless power transmission system, a transmitter, and a receiver that are suitable for apparatuses which may be used in an environment where the distance from a power supply unit varies, such as portable terminal devices.

BACKGROUND OF THE INVENTION

Wireless power transmission systems have been developed that wirelessly transmit power using electromagnetic induction, magnetic coupling, or the like. Examples of such a wireless power transmission system include systems for charging portable terminal devices.

Japanese Unexamined Patent Publication No. 2010-51137 discloses a transmitter and a receiver that perform non-contact power transmission using a magnetic resonance phenomenon. The receiver includes a received power detection circuit and a data transmission circuit that transmits a value measured by the received power detection circuit to the transmitter. The transmitter includes a data receiving circuit that receives the received power value data measured by the received power detection circuit, a transmitted power detection circuit that measures transmitted power, a transmitted power-received power comparison circuit that compares the received power value outputted by the data receiving circuit with the transmitted power value measured by the transmitted power detection circuit, a power control circuit that controls power to be transmitted on the basis of the comparison made by the transmitted power-received power comparison circuit, a storage unit that stores at least two power-to-be-transmitted setting values, and a warning LED that gives a warning to the user on the basis of the comparison made by the transmitted power-received power comparison circuit.

Japanese Unexamined Patent Publication No. 2009-278331 describes an example of a two-dimensional communication system that uses a two-dimensional communication sheet to allow power transmission between a communication apparatus and a terminal apparatus. When the amount of power stored in the terminal apparatus falls below a predetermined level in the two-dimensional communication system, the terminal apparatus sends a power transmission request message to the communication apparatus via the two-dimensional communication sheet. In response to the message, the communication apparatus transmits power via the two-dimensional communication sheet. The terminal apparatus receives the power from the communication apparatus and stores it. When the amount of the stored power reaches a predetermined level, the terminal apparatus sends a power transmission stop request message to the communication apparatus via the two-dimensional communication sheet. The communication apparatus stops transmitting power.

SUMMARY OF THE INVENTION

The configuration of Japanese Unexamined Patent Publication No. 2010-51137 controls power to be transmitted on the basis of transmission efficiency, which is the ratio between received power and transmitted power. When the transmission efficiency falls below a predetermined value, it determines that an abnormality has occurred and can stop transmitting power. However, it cannot be said that the transmission efficiency is always the same value unless an abnormality such as a failure or entry of a foreign object occurs. For example, the transmission efficiency varies depending on the positional relation between the transmitter and the receiver, the number of receivers, the positional relation between the receivers, or the like.

For this reason, when the transmission efficiency varies in a normal state, predetermined power to be transmitted will be supplied regardless of the transmission efficiency. Accordingly, even if the transmission efficiency is continuously low, the predetermined power is continuously transmitted, making the power transmission less efficient.

Further, if the transmission efficiency on the basis of which it is determined that an abnormality has occurred is set to a high value, it may be determined even in a normal state that an abnormality has occurred. This will prevent the start of power transmission, preventing the operation of the receiver. Even if the receiver includes a power storage unit such as a secondary battery or capacitor, the amount of power stored in the power storage unit will continue to decrease. The receiver will thus have to stop operating before long.

The two-dimensional communication system of Japanese Unexamined Patent Publication No. 2009-278331 includes a monitoring circuit that always monitors the amount of power stored in a power storage unit of the terminal apparatus. It thus can transmit power to the terminal apparatus in accordance with a power demand.

However, no consideration is given to variations in the efficiency of power transmission between the communication apparatus and the terminal apparatus. For example, in the case of a mobile terminal such as a portable terminal device, the transmission efficiency of power may vary from moment to moment depending on variations in the communication environment such as the positional relation between the mobile terminal and the transmitter even if the mobile terminal itself properly functions.

An advantage of the present invention is to provide a wireless power transmission system, a transmitter, and a receiver that realize averagely efficient power transmission even if the apparatuses are in a normal state but the transmission efficiency varies from moment to moment.

Another advantage of the present invention is provide a wireless power transmission system, a transmitter, and a receiver that can properly transmit power to the receiver even when the environment varies, reduce situations where the receiver must stop operating, and improve average transmission efficiency.

A wireless power transmission system according to an aspect of the present invention includes: a receiver; and a transmitter that wirelessly transmits power to the receiver. The transmitter includes: a power transmission unit that transmits power; and a power adjustment unit that adjusts power to be transmitted by the transmitter. The receiver includes: a power receiving unit that receives the power from the transmitter; and a power storage unit that stores the received power. The magnitude of the power to be transmitted is adjusted on the basis of transmission efficiency of the power transmitted to the receiver by the transmitter and the amount of power stored in the power storage unit.

According to the aspects of the present invention, the power to be transmitted is adjusted on the basis of the transmission efficiency of the power and the amount of the stored power. This makes it possible to provide a wireless power transmission system, a transmitter, and a receiver that realize averagely efficient power transmission even in an operating environment where the transmission efficiency varies. It is also possible to provide a wireless power transmission system, a transmitter, and a receiver that can reduce situations where the receiver must stop operating when the environment varies and that can improve the average transmission efficiency.

Configurations and advantages other than those described above will be clarified in the description of the embodiments below.

BRIEF DESCRIPTION OF THE DRAWINGS

FIG. 4A is an example of a power-to-be-transmitted setting table according to the first embodiment;

FIGS. 6A(A) and 6A(B) are diagrams showing examples of a power-to-be-transmitted setting table according to the second embodiment;

FIGS. 8A and 8B are diagrams showing two examples of a power-to-be-transmitted setting table for the same receiver according to the third embodiment;

FIG. 11 is a diagram showing an example of a required power setting table according to the fourth embodiment;

DETAILED DESCRIPTION OF THE PREFERRED EMBODIMENTS

According to a typical embodiment of the present invention, a wireless power transmission system includes a transmitter and a receiver that wirelessly transmit power using electromagnetic induction, magnetic coupling, or the like. The transmitter includes a power transmission unit that transmits power, a power adjustment unit that adjusts power to be transmitted, and a communication unit. The receiver includes a power receiving unit that receives power, a power detection unit that detects the received power, and a power storage unit that stores the received power. The power receiving unit also has the function of detecting the amount of power stored in the power storage unit. The transmitter adjusts power to be transmitted to the receiver, on the basis of power transmission efficiency, which is the ratio between transmitted power and received power, and the remaining energy storage level. This can realize a power transmission system which exhibits averagely high transmission efficiency even if the efficiency of wireless power transmission varies from moment to moment.

Wireless power transmission systems according to the present invention are applied to, for example, systems for charging apparatuses wirelessly used in environments where the distance from the power supply often varies. Such apparatuses include portable terminal devices such as cellular phones, smart phones, and mobile devices, transportable audio visual systems such as television displays, and cleaning robots.

Now, the embodiments will be described in detail with reference to the accompanying drawings.

First Embodiment

In this embodiment, an example of a wireless power transmission system that adjusts power to be transmitted by a transmitter on the basis of power transmission efficiency and the amount of power stored in a receiver will be described with reference to FIGS. 1 to 4C.

Figure 1:
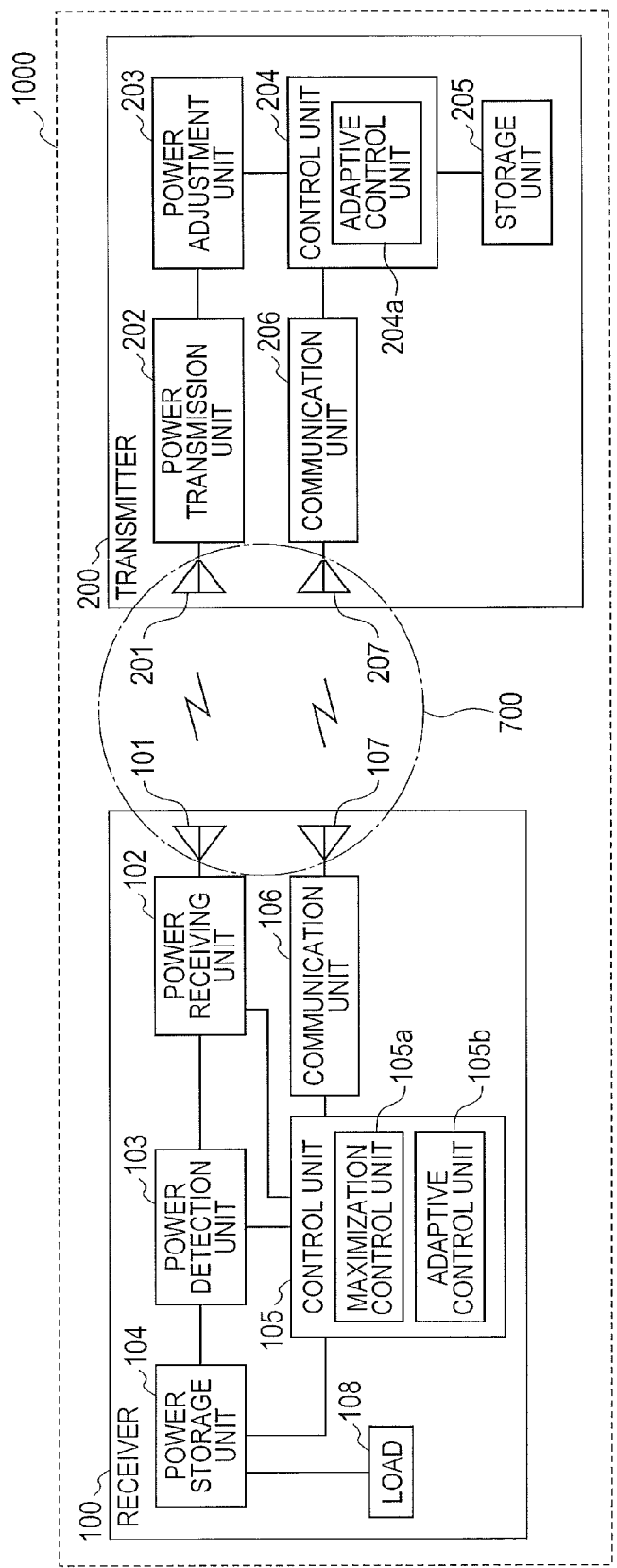
FIG. 1 is a diagram showing an example configuration of a wireless power transmission system according to a first embodiment of the present invention.

FIG. 1 is an example configuration of the wireless power transmission system according to this embodiment. A wireless power transmission system 1000 includes a receiver 100 and a transmitter 200. The receiver 100 includes a power receiving antenna 101, a power receiving unit 102, a power detection unit 103, a power storage unit 104, a control unit 105, a communication unit 106, and a communication antenna 107. An electronic apparatus such as a cellular phone is coupled to the power storage unit 104 as a load 108.

The transmitter 200 includes a power transmission antenna 201, a power transmission, unit 202, a power adjustment unit 203, a control unit 204, a storage unit 205, a communication unit 206, and a communication antenna 207. A table for setting power to be transmitted and mathematical expressions are stored in the storage unit 205.

The power receiving unit 102 of the receiver 100 receives power wirelessly transmitted by the transmitter 200 via the power receiving antenna 101 and outputs the power to the power detection unit 103. The power detection unit 103 receives the power and detects the level thereof. The power storage unit 104 is a load for storing the received power. A maximization control unit 105a of the control unit 105 controls the power receiving unit 102 so that the received power is maximized. An adaptive control unit 105b thereof then acquires the power level detected by the power detection unit 103 and the amount of power stored in the power storage unit 104 and controls the communication unit 106. The communication unit 106 generates a communication signal and communicates with the transmitter 200 via the communication antenna 107.

The communication unit 206 of the transmitter 200 communicates with the receiver 100 via the communication antenna 207. The control unit 204 includes an adaptive control unit 204a. It acquires the information received by the communication unit 206a and information stored in the storage unit 205 and controls the power adjustment unit 203. The power adjustment unit 203 adjusts power to be outputted by the power transmission unit 202 under the control of the control unit 204. The power transmission unit 202 wirelessly transmits the power to the receiver 100 via the power transmission antenna 201.

In the present invention, space containing an electric field or magnetic field through which wireless power transmission or wireless communication is possible by means of interfaces such as a pair of antennas is defined as wireless power transmission space 700. Such interfaces may be any type of interfaces as long as the interfaces enable wireless power transmission or wireless communication using electromagnetic induction, magnetic coupling, or the like in wireless power transmission space. Examples of the power receiving and transmission antennas 101 and 201 and the communication antennas 107 and 207 serving as interfaces include dipole antennas, patch antennas, coils, electrodes, resonators, couplers, and power transmission media using a sheet-shaped dielectric. Such interfaces will be hereafter simply referred to as antennas. Note that the wireless power transmission systems according to the present invention use a frequency of, e.g., 2.4 GHz. However, needless to say, the present invention is not limited to this frequency.

Alternatively, a power receiving antenna 101 additionally having the function of the communication antenna 107 may be coupled to the communication unit 106. Likewise, a power transmission antenna 201 additionally having the function of the communication antenna 207 may be coupled to the communication unit 206.

The receiver 100 may be incorporated into an electronic apparatus (load) such as a cellular phone. Likewise, the transmitter 200 may be incorporated into another electronic apparatus. The power storage unit 104 is, for example, a secondary battery such as a lithium ion battery, or capacitor.

The control unit 204 may store the information acquired from the communication unit 206 in the storage unit 205. The storage unit 205 is, for example, a flash memory, hard disk, SSD, or the like.

The units included in the receiver 100 may operate on power stored in the power storage unit 104 or power received by the power receiving unit 102.

Figure 2:
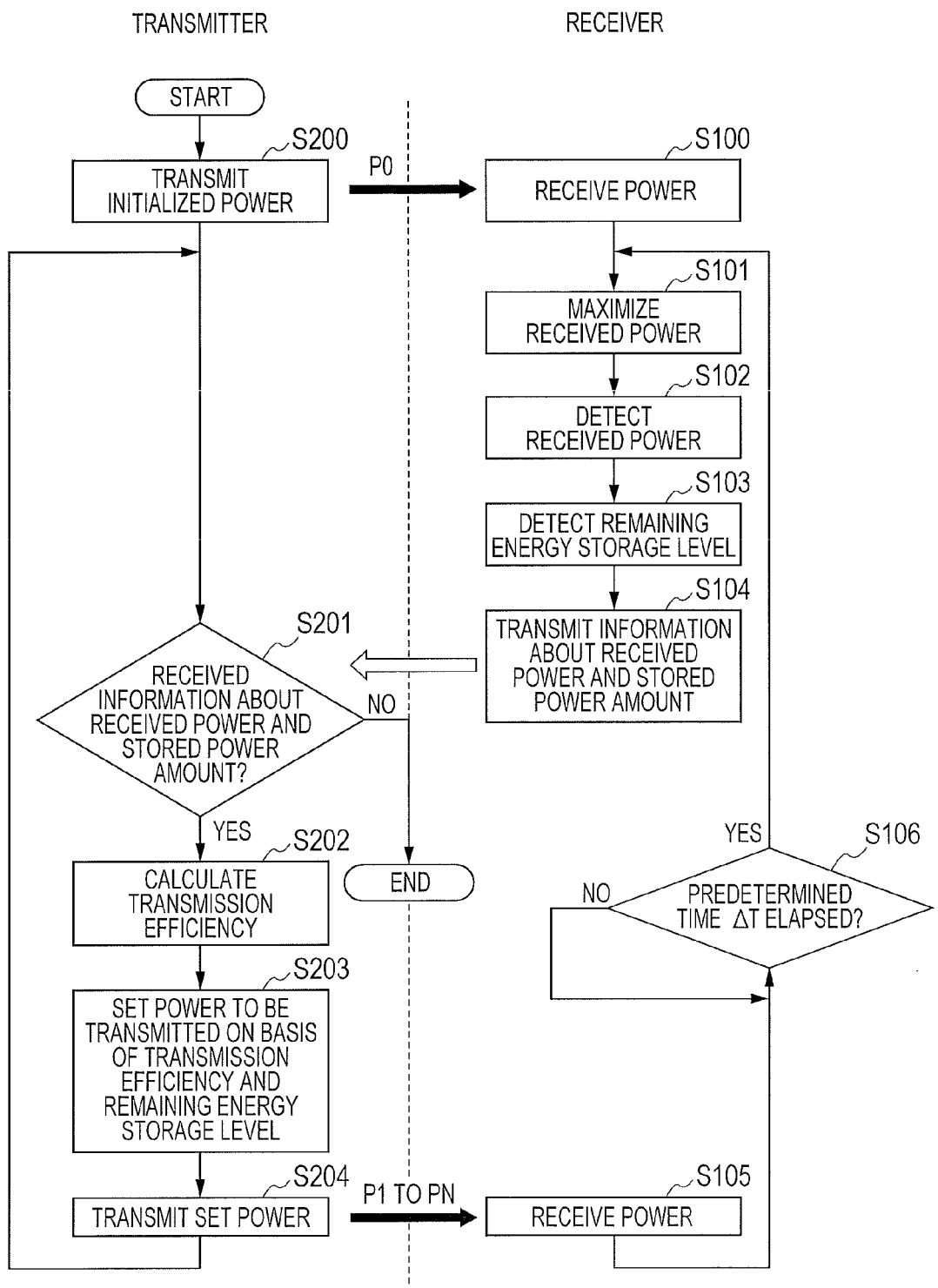
FIG. 2 is a flowchart showing a process performed by a transmitter and a receiver according to the first embodiment.

FIG. 2 is a flowchart showing a wireless power transmission process performed by the transmitter and the receiver according to this embodiment.

The transmitter 200 initializes the power adjustment unit 203 and wirelessly transmits initialized power (P0) from the power transmission unit 202. The receiver 100 receives the initialized power (P0) at the power receiving unit 102 (S100). The maximization control unit 105a of the control unit 105 then controls the power receiving unit 102 so that the received power is maximized (S101). The power detection unit 103 then detects the received power (S102), and the adaptive control unit 105b of the control unit 105 detects the amount of power stored in the power storage unit 104 (S103). The communication unit 106 then transmits information about the detected received power and energy storage level to the transmitter 200 (S104).

When the transmitter 200 receives the information about the received power and energy storage level at the communication unit 206 (S201), the adaptive control unit 204a of the control unit 204 calculates the transmission efficiency (S202). The control unit 204 then sets power to be transmitted using the table and mathematical expressions stored in the storage unit 205 on the basis of the transmission efficiency and the remaining energy storage level (S203). The control unit 204 then controls the power adjustment unit 203 and transmits the set power P1 from the power transmission unit 202 (S204). The receiver 100 then receives the transmitted power at the power receiving unit 102 (S105).

Thereafter, the received power maximization step (S101) and later steps are repeated every predetermined time interval $\Delta T$ (S106) and the power transmission unit 202 transmits set power PN to the power receiving unit 102.

Any of the received power detection step S102 and the energy storage level detection step S103 may be performed first.

Figure 3A:
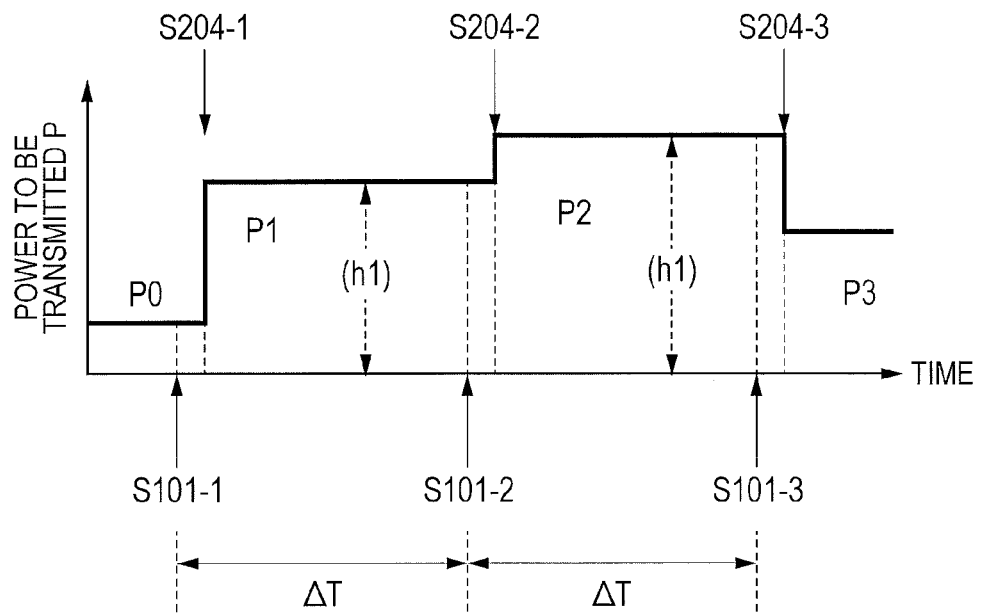
FIG. 3A is a diagram showing an example of the time waveform of power to be transmitted according to the first embodiment.
Figure 3B:
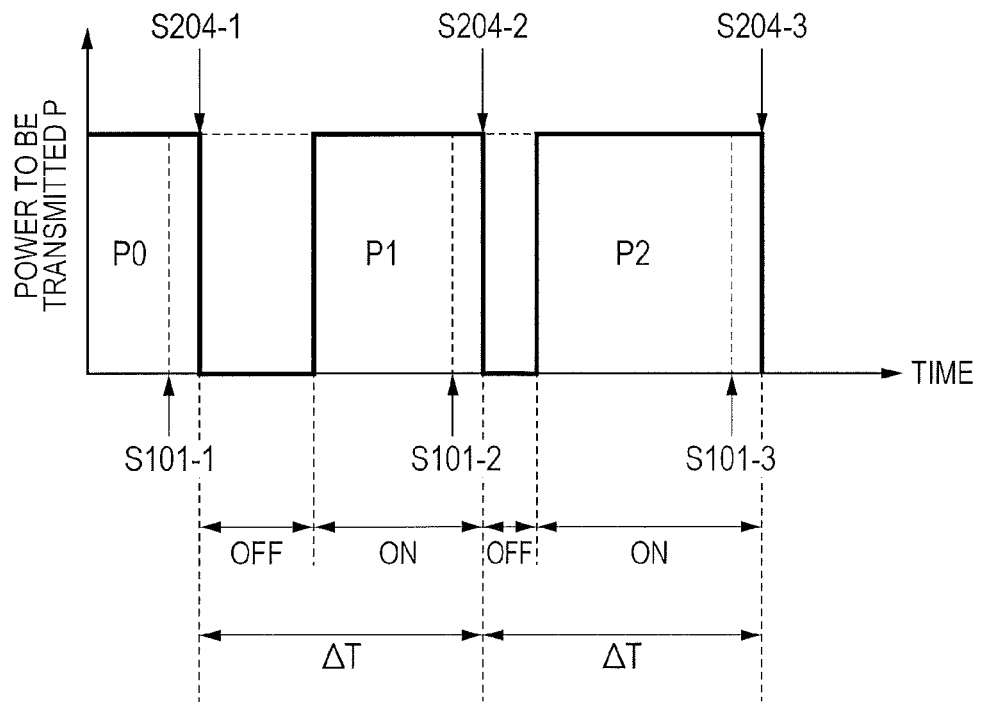
FIG. 3B is a diagram showing another example of the time waveform of power to be transmitted according to the first embodiment.

FIG. 3A is a graph showing an example of the time waveform of a power transmission signal. FIG. 3B is a graph showing another example of the time waveform of a power transmission signal.

The example of FIG. 3A is an example where the power-to-be-transmitted P setting step S203 is performed using the amplitude of a power transmission signal. Power to be transmitted (P1, P2, -, PN) is updated by updating the amplitude of a power transmission signal (h1, h2, -) for each predetermined time interval $\Delta T$, during which the steps from the received power maximization step (S101) to the set power transmission step S204 are performed.

The example of FIG. 3B is an example of duty control where the power-to-be-transmitted setting step S203 is performed using the ratio between the power transmission time (ON) and the power transmission stop time (OFF) in the predetermined time interval $\Delta T$. The power transmission stop time (OFF) is set for each predetermined time interval $\Delta T$, during which the steps from the received power maximization step (S101) to the set power transmission step S204 are performed, and the time-averaged power to be transmitted (P1, P2, -, PN) is updated. The first half of each time interval $\Delta T$ is defined as the power transmission stop time (OFF) and the second half thereof is defined as the power transmission time (ON). This is because information about received power over the power transmission time (ON) is used to calculate power to be transmitted (PN) over the next cycle (time interval $\Delta T$) for update.

Figure 4B:
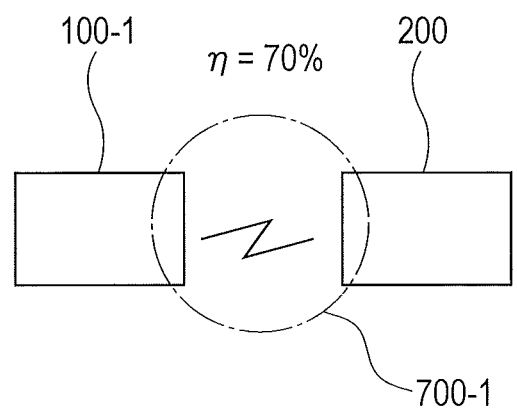
FIGS. 4B(A) and 4B(B) are diagrams showing examples that differ in transmission efficiency from each other.
Figure 4B:
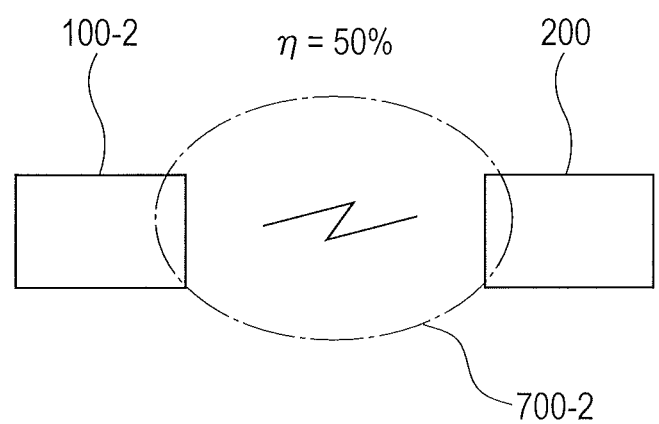

FIG. 4A is an example of a power-to-be-transmitted setting table according to this embodiment. In this example, the power to be transmitted P (W) is set to 10 to 0 W in accordance with transmission efficiency $\alpha$(%) and the remaining energy storage level B(%). The transmission efficiency $\alpha$ varies from moment to moment depending on variations in the positional relation between the transmitter and the receiver, the number of receivers, the positional relation between the receivers, or the like. FIG. 4B(A) shows an example of a state where the transmission efficiency is high and FIG. 4B(B) shows an example of a state where the transmission efficiency is low. FIGS. 4B(A) and 4B(B) show the positional relation between the receiver 100 and the transmitter 200 within the wireless power transmission space 700 when the transmission efficiency is 70% and when the transmission efficiency is 50%, respectively. The transmission efficiency tends to become lower as the distance between the receiver 100 and the transmitter 200 is longer.

For this reason, in this embodiment, power to be transmitted is set to a higher value as the transmission efficiency is higher; power to be transmitted is set to a lower value as the remaining energy storage level is higher. Power to be transmitted may be set without stages on the basis of the transmission efficiency and the remaining energy storage level or may be set using two values, that is, execution of power transmission and stop of power transmission.

In this embodiment, when the transmission efficiency becomes a low value that does not occur in a normal state, it is determined that an abnormality has occurred, stopping power transmission. This value is set to a very low value that is not indicated unless an abnormality such as a failure or entry of a foreign object occurs. In the example shown in FIG. 4A, when the transmission efficiency is 20% or less, it is determined that an abnormality has occurred, stopping power transmission. On the other hand, when the transmission efficiency exceeds 20% but is a low value close to 20%, power transmission is not stopped uniformly: when the level of energy stored in the receiver is low, power transmission is executed; when it is high, power transmission is stopped. As seen, reducing situations in which the receiver must stop operating can improve the average transmission efficiency.

Figure 4C:
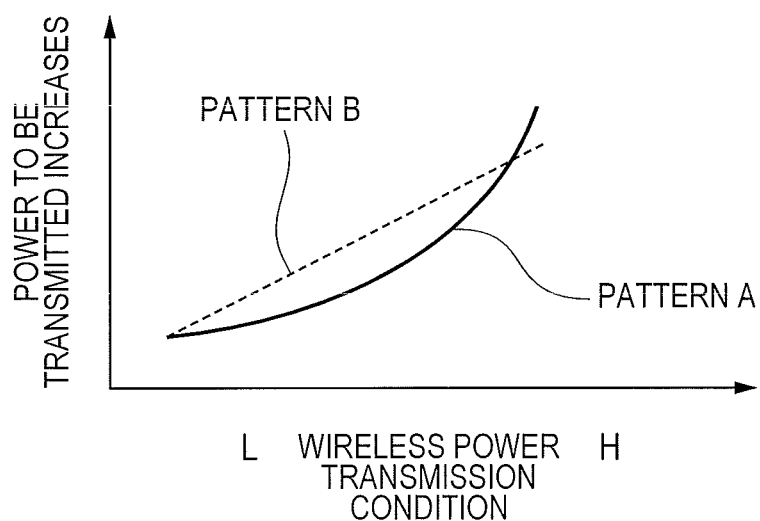
FIG. 4C is a graph showing the relationship between a wireless power transmission condition and power to be transmitted according to the first embodiment.

FIG. 4C is a graph showing an approximate relationship between a wireless power transmission condition and power to be transmitted. The wireless power transmission condition is preferably changed on the basis of the latest transmission efficiency α(%) and the remaining energy storage level B (%) in the wireless power transmission system. Specifically, the wireless power transmission condition is always (periodically) detected in the wireless power transmission system, and power to be transmitted is made higher as the wireless power transmission condition becomes better (H). A pattern A changes nonlinearly, whereas a pattern B changes linearly.

Accordingly, instead of the table of FIG. 4A, the power to be transmitted P (W) can may be defined as a function of the transmission efficiency α, which gives the wireless power transmission condition, and the remaining energy storage level B, P=f(B, α).

More specifically, the power to be transmitted P may be represented by the following Formula (1) and stored in the storage unit 205.

$$P=(1/B)\times \alpha \times X \quad (1)$$

where X(W) is a constant.

According to this embodiment, the system updates the magnitude of power to be transmitted as appropriate on the basis of the transmission efficiency even in environments where the system is in a normal state but the wireless power transmission condition changes from moment to moment, so that optimum power transmission is always performed. The entire system thus can realize averagely efficient power transmission.

As described above, the wireless power transmission system according to this embodiment adjusts the power to be transmitted by the transmitter as appropriate on the basis of the power transmission efficiency and the amount of power stored in the receiver. This realizes averagely efficient power transmission. Further, the wireless power transmission system can reduce the risk that the amount of power stored in the receiver will decrease too much.

Second Embodiment

A wireless power transmission system, a transmitter, and a receiver according to a second embodiment of the present invention will be described with reference to FIGS. 5 to 6B. In this embodiment, the power to be transmitted by the transmitter is adjusted on the basis of the present power transmission efficiency and the past power transmission efficiency with respect to a certain receiver and the amount of power stored in the receiver. In this embodiment, the transmission efficiency is calculated on the basis of the present and the past (one to multiple cycles) power transmission efficiency histories, in other words, on the basis of the cumulative incidence.

Figure 5:
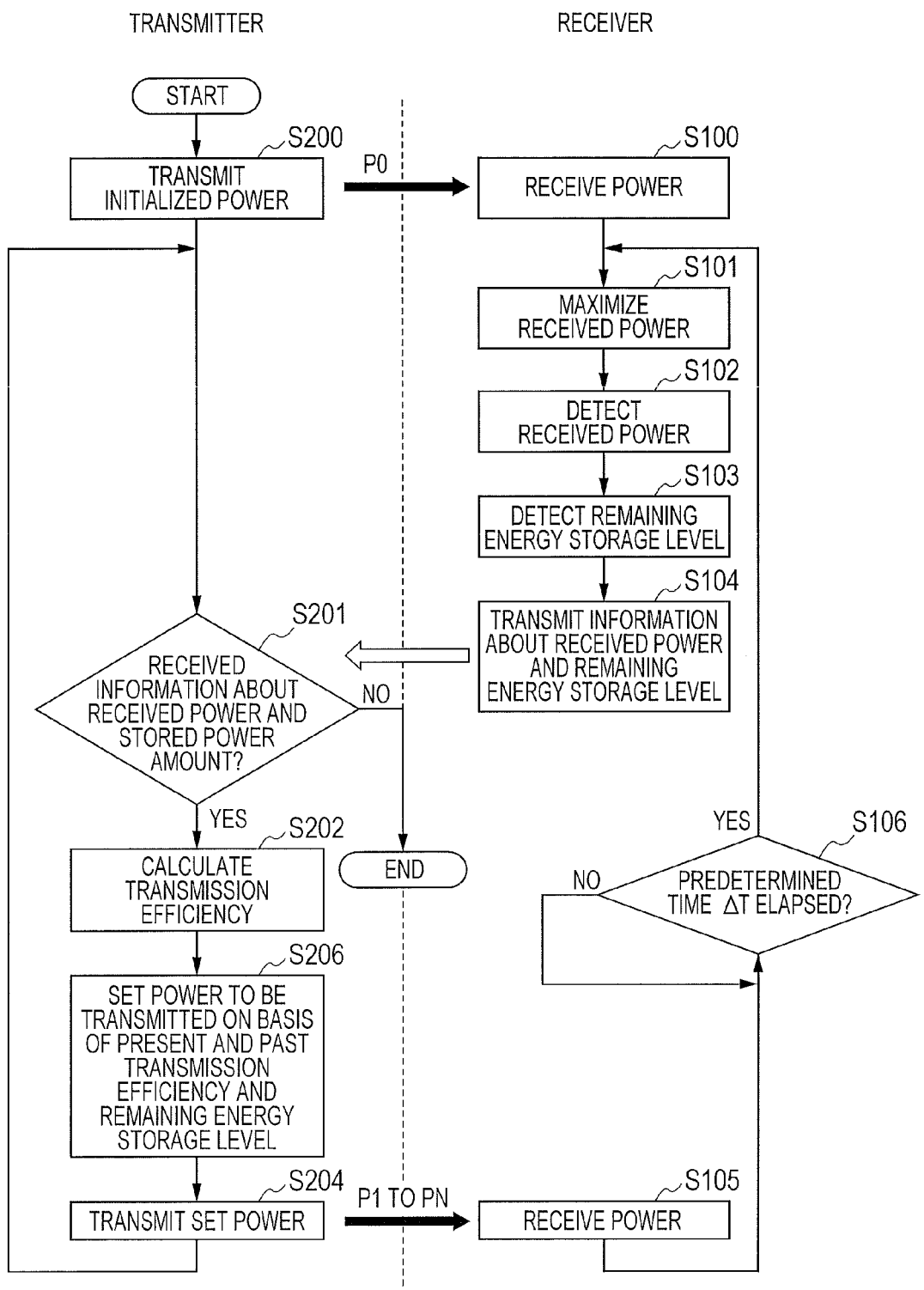
FIG. 5 is a flowchart showing a process performed by a transmitter and a receiver according to a second embodiment of the present invention.

FIG. 5 is a flowchart a process performed by the transmitter and the receiver according to this embodiment. The configuration and flow related to the received power maximization are the same as those in the first embodiment and will not be described. (The same goes for the other embodiments.)

The transmitter 200 initializes the power adjustment unit 203 and transmits initialized power from the power transmission unit 202 (S200). The receiver 100 receives the initialized power S200 at the power receiving unit 102 (S100). The control unit 105 then controls the power receiving unit 102 so that the received power is maximized (S101). The power detection unit 103 then detects the received power (S102). The control unit 105 then detects the amount of power stored in the power storage unit 104 (S103). The communication unit 106 then transmits information about the detected received power and energy storage level to the transmitter 200 (S104).

The transmitter 200 receives the information about the received power and energy storage level at the communication unit 206 (S201). The control unit 204 then calculates the transmission efficiency (S202) and sets power to be transmitted on the basis of the present power and past (one to multiple cycles) power transmission efficiency histories, that is, the cumulative incidence of transmission efficiency and the amount of power stored in the receiver using the table and mathematical expressions stored in the storage unit 205 (S206). Power to be transmitted may be set using the amplitude of a power transmission signal or the ratio between the power transmission time and the power transmission stop time. The control unit 204 then controls the power adjustment unit 203, and the power transmission unit 202 transmits the set power (S204). The receiver 100 then receives the transmitted power at the power receiving unit 102 (S105). Thereafter, the received power detection step S102 and later steps are repeated.

Any of the received power detection step S102 and the energy storage level detection step S103 may be performed first.

Figure 6B:
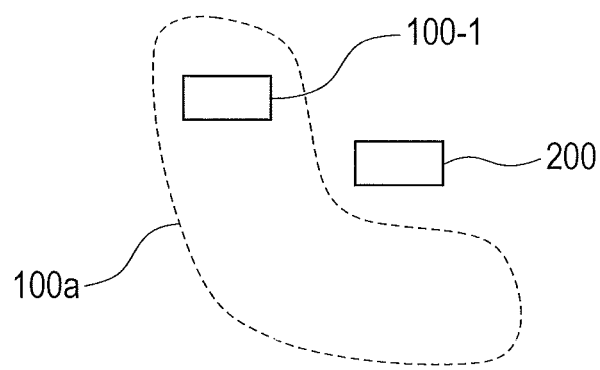
FIGS. 6B(A) and 6B(A) are diagrams showing examples that differ from each other in the transmission efficiency history of the same receiver.
Figure 6B:
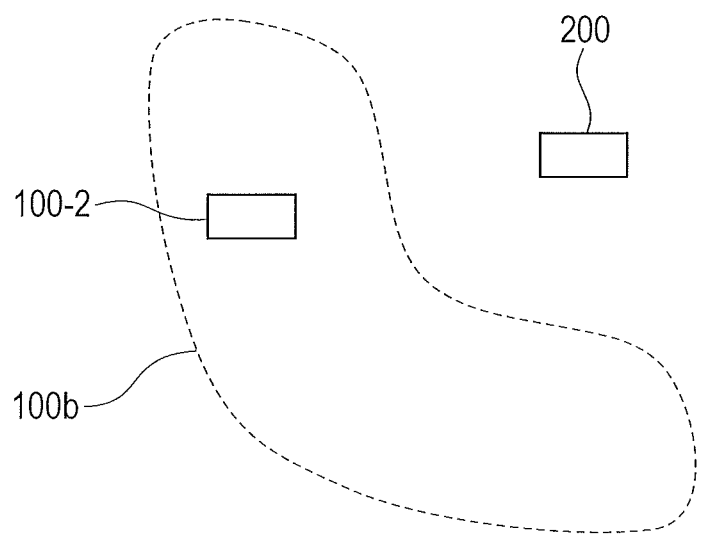

FIGS. 6A(A) and 6A(B) are diagrams showing an example of a power-to-be-transmitted setting table according to this embodiment. FIGS. 6B(A) and 6B(B) are diagrams showing two examples that differ from each other in the transmission efficiency history of the same receiver.

FIG. 6A(A) shows an example setting of power to be transmitted when the incidence of high transmission efficiency is high, and FIG. 6A(B) shows an example setting of power to be transmitted when the incidence of low transmission efficiency is high. FIG. 6B(A) corresponds to FIG.

6A(A) and shows an example (100-1) where the receiver 100 moves within a range 100a, which is close to the transmitter 200, as an example where the incidence of high transmission efficiency is high. FIG. 6B(B) corresponds to FIG. 6A(B) and shows an example (100-2) where the receiver 100 moves within a range 100b, which is distant from the transmitter 200, as an example where the incidence of low transmission efficiency is high.

In any case, power to be transmitted is set to a higher value as the then transmission efficiency is higher. If power to be transmitted is set to, for example, four stages, the transmission efficiency in each stage has a different threshold. If the incidence of high transmission efficiency is high with respect to a receiver 100, for example, if the number of movement histories of the receiver 100 within a range close to the transmitter 200 is large, the threshold is set to a higher value. If the incidence of low transmission efficiency is high with respect to the same receiver 100, for example, if the number of movement histories of the receiver 100 within a range distant from the transmitter 200 is large, the threshold is set to a lower value.

Alternatively, power to be transmitted may be set without stages on the basis of the incidence of transmission efficiency or may be set using two values, that is, execution of power transmission and stop of power transmission. The incidence of transmission efficiency may be obtained from, for example, the distribution for each receiver or a distribution obtained by summing up the transmission efficiency incidences of some receivers. Alternatively, the incidence may be obtained from, for example, the transmission efficiency over the past one day or that over the past one hour.

Instead of the tables (A) and (B) of FIG. 6A, the power to be transmitted P (W) may be represented by a function of history values of the power transmission efficiency $\alpha$(%) and the remaining energy storage level B(%) and stored in the storage unit 205.

As described above, the wireless power transmission system according to this embodiment adjusts power to be transmitted to the transmitter on the basis of the present and past power transmission efficiency. Thus, when the transmission efficiency is high with respect to a receiver having a high incidence of high transmission efficiency, more power can be transmitted to that receiver. The system thus can perform averagely more efficient power transmission. Further, even when the transmission efficiency is low with respect to a receiver having a high incidence of low transmission efficiency, sufficient power can be transmitted to that receiver. The system thus can further reduce the risk that the remaining energy storage level will decrease too much.

Third Embodiment

A wireless power transmission system, a transmitter, and a receiver according to a third embodiment will be described with reference to FIGS. 7 to 8. In this embodiment, the transmitter adjusts power to be transmitted thereby on the basis of the power transmission efficiency, the amount of power stored in the receiver, and the power consumption of the receiver.

Figure 7:
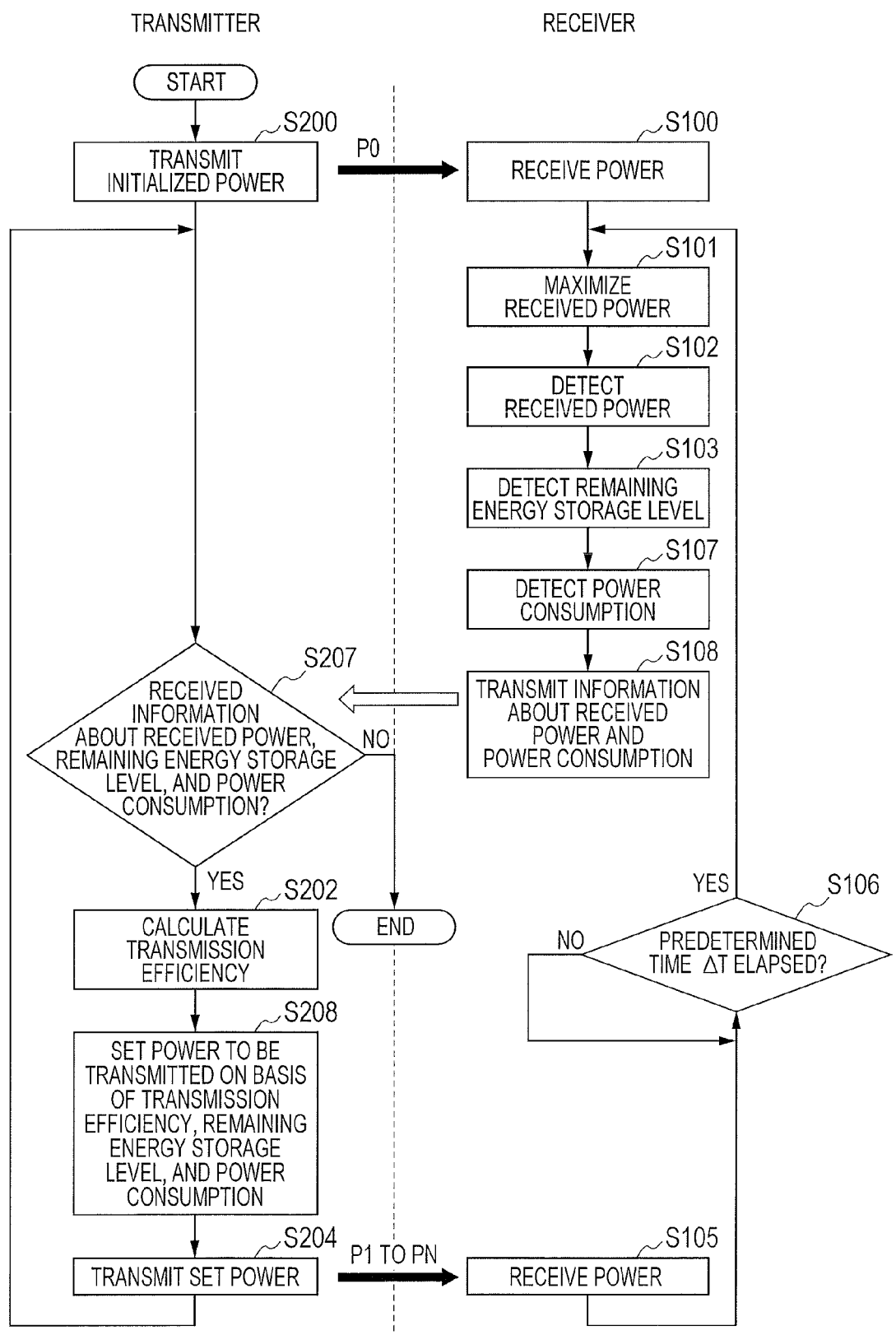
FIG. 7 is a flowchart showing a process performed by a transmitter and a receiver according to a third embodiment of the present invention.

FIG. 7 is a flowchart a process performed by the transmitter and the receiver according to this embodiment.

The transmitter 200 initializes the power adjustment unit 203 and transmits initialized power from the power transmission unit 202 (S200). The receiver 100 receives the initialized power 5200 at the power receiving unit 102 (S100). The control unit 105 then controls the power receiving unit 102 so that the received power is maximized (S101). The power detection unit 103 then detects the received power (S102). The control unit 105 then detects the amount of power stored in the power storage unit 104 (S103). The control unit 105 then detects the power consumption of the receiver 100 (S106). The communication unit 106 then transmits information about the detected received power, energy storage level, and power consumption to the transmitter 200 (S107).

The transmitter 200 receives the information about the received power, the remaining energy storage level, and the power consumption at the communication unit 206 (S207). The control unit 204 then calculates the transmission efficiency (S202) and sets power to be transmitted on the basis of the transmission efficiency, the remaining energy storage level, and the power consumption using the table and mathematical expressions stored in the storage unit 205 (S208). The power to be transmitted may be set using the amplitude of a power transmission signal or the ratio between the power transmission time and the power transmission stop time. The control unit 204 then controls the power adjustment unit 203, and the power transmission unit 202 transmits the set power (S204). The receiver 100 then receives the transmitted power at the power receiving unit 102 (S105). Thereafter, the received power detection step S102 and later steps are repeated.

Any of the received power detection step S102, the energy storage level detection step S103, and the power consumption detection step S106 may be performed first.

FIGS. 8(A) and 8(B) show two examples of a power-to-be-transmitted setting table with respect to the same receiver.

FIG. 8(A) shows an example setting of power to be transmitted when the power consumption is high. FIG. 8(B) shows an example setting of power to be transmitted when the power consumption is low. In any case, power to be transmitted is set to a higher value as the transmission efficiency is high or the remaining energy storage level is low. When the power consumption is high, power to be transmitted is set to a higher value than that when the power consumption is low. For example, assume that the remaining energy storage level is 30% and the transmission efficiency is 70%. When the power consumption is high, the power to be transmitted is set to 8 W; when the power consumption is low, it is set to 6 W. While the power consumption is set to two stages in FIG. 8, it may be set to multiple stages or without stages. To control power consumption, an average value over a certain time may be used rather than an instantaneous value. The average value of power consumption here may be calculated by the receiver or by the transmitter. Further, power consumption may be calculated from histories of the remaining energy storage level and those of received power. The sum of a variation in the remaining energy storage level and the integral of received power over a certain time serves as the integral of power consumption.

Instead of the tables (A) and (B) of FIG. 8, the power to be transmitted P (W) may be represented by a function of the present and past power transmission efficiency $\alpha$(%), the remaining energy storage level B(%), and the power consumption C (W), P=f(B, $\alpha$, C), and stored in the storage unit 205.

As described above, the wireless power transmission system according to this embodiment adjusts the power to be transmitted by the transmitter on the basis of the power transmission efficiency, the amount of power stored in the receiver, and the power consumption of the receiver. Thus, when the power consumption of the receiver is high, more power can be transmitted, further reducing the risk that the remaining energy storage level will decrease too much. Further, if the power consumption of the receiver is low, more power can be transmitted when the transmission efficiency is high, performing averagely more efficient power transmission.

Fourth Embodiment

A wireless power transmission system, a transmitter, and a receiver according to a fourth embodiment of the present invention will be described with reference to FIGS. 9 to 11. In this embodiment, the receiver adjusts power to be transmitted by the transmitter on the basis of the power transmission efficiency and the amount of power stored in the receiver.

Figure 9:
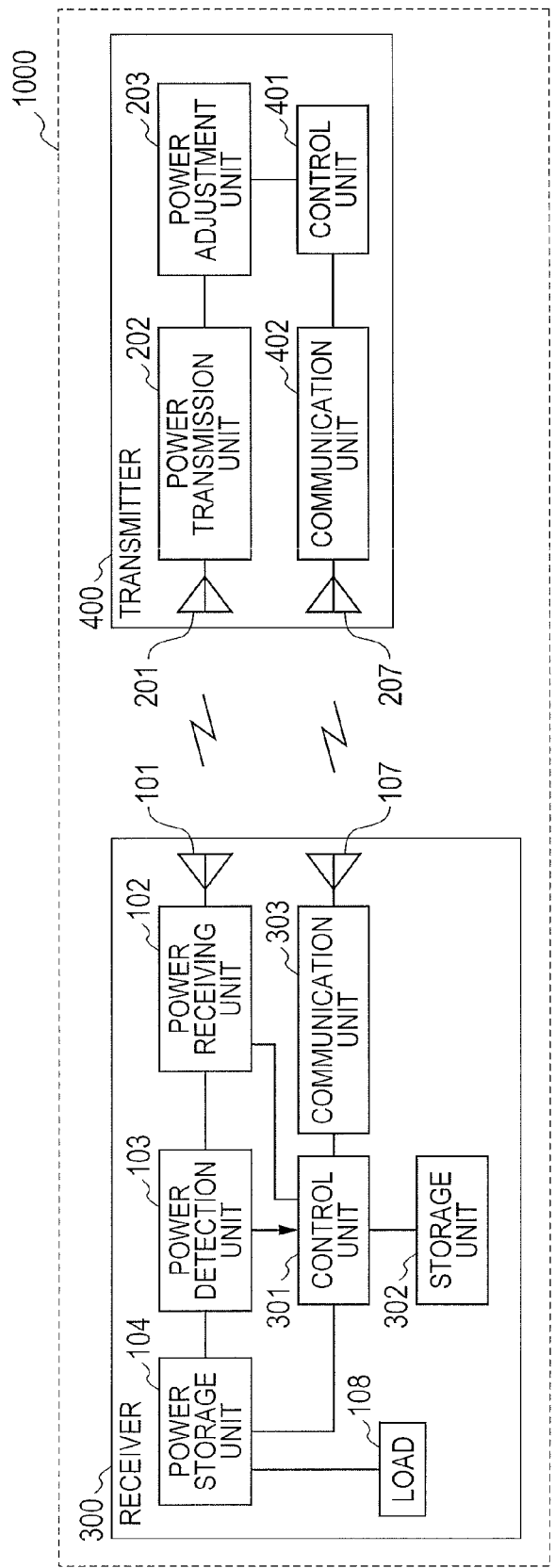
FIG. 9 is a diagram showing an example configuration of a wireless power transmission system according to a fourth embodiment of the present invention.

FIG. 9 is a diagram showing an example configuration of the wireless power transmission system according to this embodiment. The components having the same characters and functions as those shown in FIG. 1 and described above, of a receiver 300 and a transmitter 400 in FIG. 9 will not be described.

The receiver 300 includes the power receiving antenna 101, the power receiving unit 102, the power detection unit 103, the power storage unit 104, a control unit 301, a storage unit 302, a communication unit 302, and the communication antenna 107.

The transmitter 400 includes the power transmission antenna 201, the power transmission unit 202, the power adjustment unit 203, a control unit 401, a communication unit 402, and the communication antenna 207.

The control unit 301 acquires a power level detected by the power detection unit 103, the amount of power stored in the power storage unit 104, power to be transmitted received by the communication unit 303, and information stored in the storage unit 302 and controls the communication unit 303. The communication unit 303 communicates with the transmitter 400 via the communication antenna 107.

The control unit 401 transmits information about power to be transmitted set in the power adjustment unit 203 to the receiver 300 using the communication unit 402. The control unit 401 also acquires information about the receiver 300 received by the communication unit 402 and controls the power adjustment unit 203.

While the receiver 300 includes only the power storage unit 104 as a load, an electronic apparatus such as a cellular phone may additionally be coupled thereto. The receiver 300 may be incorporated into an electronic apparatus such as a cellular phone. Likewise, the transmitter 400 may be incorporated into another electronic apparatus. The power storage unit 104 is, for example, a secondary battery such as a lithium ion battery, or capacitor.

The control unit 301 may store, in the communication unit 302, the information acquired from the communication unit 303, the information acquired from the power detection unit 103, the information acquired from the power storage unit 104, and the like. The control unit 301 may store, in the storage unit 302, the information calculated and transmitted to the transmitter 400 thereby. The storage unit 302 is, for example, a flash memory, hard disk, or SSD.

The units included in the receiver 300 may operate on power stored in the power storage unit 104 or power received by the power receiving unit 102.

Figure 10:
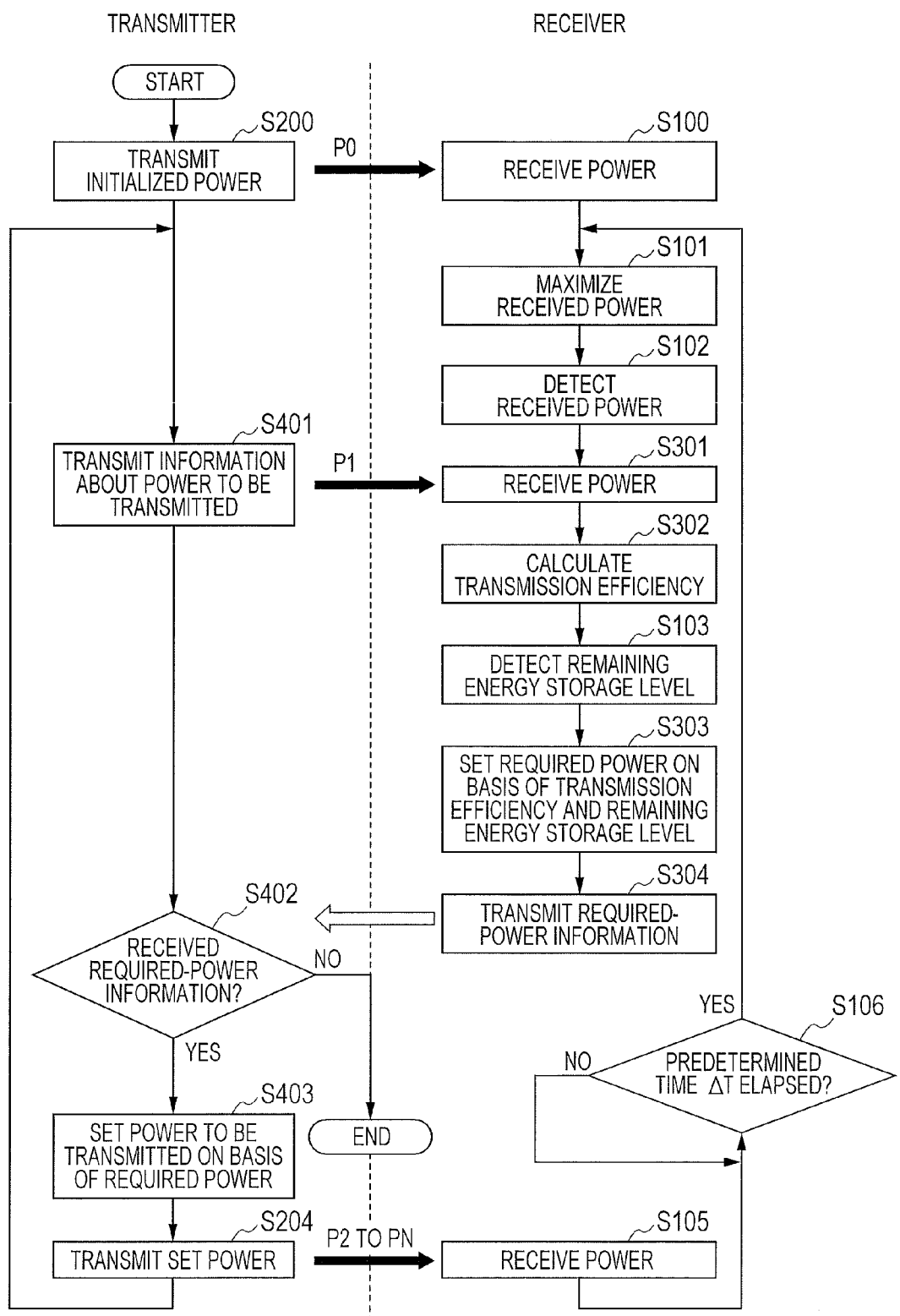
FIG. 10 is a flowchart showing a process performed by a transmitter and a receiver according to the fourth embodiment.

FIG. 10 is a flowchart showing a process performed by the transmitter and the receiver according to this embodiment. The transmitter 400 initializes the power adjustment unit 203 and transmits initialized power from the power transmission unit 202 (S200). The receiver 300 receives the initialized power S200 at the power receiving unit 102 (S100). The control unit 105 then controls the power receiving unit 102 so that the received power is maximized (S101). The power detection unit 103 then detects the received power (S102).

The transmitter 400 then transmits information about power to be transmitted based on the setting of the power adjustment unit 203 from the communication unit 402 to the receiver 300 (S401). The receiver 300 receives the information transmitted by the transmitter 400 at the communication unit 303 (S301).

The control unit 301 acquires the information about the power to be transmitted received by the communication unit 303 and the information about the received power detected by the power detection unit 103 and calculates transmission efficiency (S302). The control unit 301 then detects the amount of power stored in the power storage unit 104 (S103).

The control unit 301 then sets required power, power that the control unit 301 requires the transmitter to transmit, on the basis of the calculated transmission efficiency and the detected remaining energy storage level using the table and expressions stored in the communication unit 302 (S303). The communication unit 303 transmits information about the required power to the transmitter 400 (S304).

The transmitter 400 receives the information about the required power at the communication unit 402 (S402). The control unit 401 then sets power to be transmitted (S403). The power to be transmitted may be set using the amplitude of a power transmission signal or the ratio between the power transmission time and the power transmission stop time. The control unit 401 then controls the power adjustment unit 203 and transmits the set power from the power transmission unit 202 (S204). The receiver 300 then receives the transmitted power at the power receiving unit 102 (S105). Thereafter, the received power detection step S102 and later steps are repeated.

Any of the received power detection step S102, the energy storage level detection step S103, and the power-to-be-transmitted information receiving step S301 may be performed first.

FIG. 11 is a diagram showing an example of a required power setting table according to this embodiment. In this example, the required power is set to 10 to 0 W in accordance with the transmission efficiency and the remaining energy storage level. The required power is set to a higher value as the transmission efficiency is higher; the required power is set to a lower value as the remaining energy storage level is higher. Alternatively, the required power may be set without stages on the basis of the transmission efficiency and the remaining energy storage level or may be set using two values, that is, execution of requirement and stop of requirement.

Also in this embodiment, instead of the table of FIG. 11, the power to be transmitted P (W) may be represented by a function of the power transmission efficiency and the remaining energy storage level, $P=f(B, \alpha)$, and stored in the storage unit 205.

As described above, the wireless power transmission system according to this embodiment allows the receiver to adjust the power to be transmitted by the transmitter on the basis of the power transmission efficiency and the amount of power stored in the receiver. The system thus can realize averagely efficient power transmission. Further, the wireless power transmission system can reduce the risk that the amount of power stored in the receiver will decrease too much.

Further, since the receiver calculates the transmission efficiency, information can be collectively managed when using multiple different transmitters. For example, if receivers are incorporated in cellular phones and multiple transmitters are placed in houses, offices and commercial facilities, and the like, the transmitters will handle the enormous number of receivers. This makes information management difficult and the configuration complicated. However, the wireless power transmission system according to this embodiment allows the individual receivers to manage information about themselves. This can simplify the configuration of the transmitters.

Alternatively, as in the second embodiment, required power may be adjusted on the basis of the present and past power transmission efficiency. Alternatively, as in the third embodiment, required power may be adjusted on the basis of the power transmission efficiency, the amount of power stored in the receiver, and the power consumption of the receiver.

The receiver may additionally include a display unit for showing information about the transmission efficiency to the user. Showing information about the transmission efficiency can urge the user to use the power receiving unit while further considering efficiency.

Fifth Embodiment

A wireless power transmission system, a transmitter, and a receiver according to a fifth embodiment of the present invention will be described with reference to FIGS. 12A to 14. In this embodiment, a power transmission medium including a sheet-shaped dielectric is used as wireless power transmission space, and wireless power transmission or wireless communication is performed by allowing an evanescent wave to propagate through this power transmission medium. The transmitter adjusts power to be transmitted thereby on the basis of the power transmission efficiency and the amount of power stored in the receiver without acquiring information about received power from the receiver.

Figure 12A:
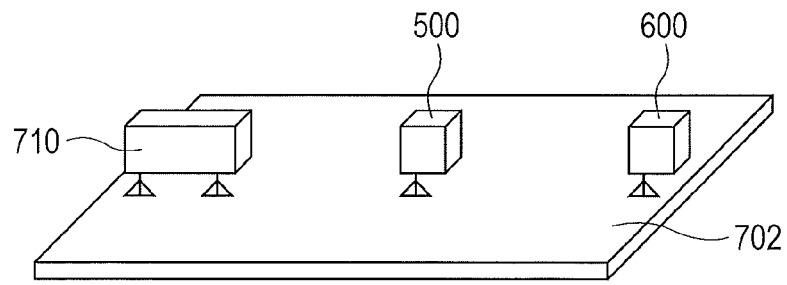
FIG. 12A is an external perspective view schematically showing the apparatus configuration of a wireless power transmission system according to a fifth embodiment of the present invention.

FIG. 12A is an external perspective view schematically showing the apparatus configuration of the wireless power transmission system according to the fifth embodiment.

A transmitter 600, a receiver 500, and a remaining power detection apparatus 710 included in a wireless power transmission system 1000 are all coupled to the top surface (or side surface) of a power transmission medium 702 functioning as wireless power transmission space 700. The transmitter 600 transmits power to the receiver 500 via the power transmission medium 702. The remaining power detection apparatus 710 detects power remaining in the power transmission medium 702.

The power transmission medium 702 is composed of a sheet-shaped waveguide including a dielectric and conductors and has, for example, holes or meshes on the upper conductor so that it is used as a power transmission path between the apparatuses. Specifically, the power transmission medium 702 includes a sheet-shaped dielectric including a waveguide structure and having an approximately constant thickness, a metallic conductor formed on one surface of the dielectric in the form of holes or meshes, and a metallic conductor disposed on all of the other surface of the dielectric. Multiple rectangular apertures surrounded by the mesh conductor are disposed at intervals shorter than the wavelength of an electromagnetic wave. The transmitter 600, the receiver 500, and the remaining power detection apparatus 710 each include an antenna, and these antennas are disposed on the mesh conductor of the power transmission medium 702. Since power propagates through the power transmission medium 702, part of power transmitted by the transmitter 600 via its antenna but not received by the antenna of the receiver 500 remains in the power transmission medium 702. Instead of the waveguide, an interface such as a coil may be formed in the dielectric.

The power transmission medium 702 is disposed as, for example, a sheet for covering the surface of a desk in an office and has the function of wirelessly supplying power from a power supply serving as the transmitter 600 to a personal computer, mobile terminal, or the like serving as the receiver 500. The personal computer or mobile terminal can receive power when the user simply places it at any position on the desk.

The strength of power propagating through the power transmission medium 702 decreases in accordance with the distance from the transmitter 600 or the placement state of the receiver 500. For example, assume that the transmitter 600 is located adjacent to one edge of the rectangular power transmission medium 702 and the remaining power detection apparatus 710 is located adjacent to the other edge thereof, as shown in FIG. 12A, and that power transmitted by the transmitter 600 is 100. If no receiver 500 is present on the power transmission medium 702, the remaining power detected by the remaining power detection apparatus 710 will be, e.g., 95 due to power loss (=no-load power loss) according to the transmission efficiency of the power transmission medium 702. If one receiver 500 is present on the power transmission medium 702, the receiver 500 will receive predetermined power and the remaining power detected by the remaining power detection apparatus 710 will be, e.g., 20. If two receivers 500 are present, the receivers 500 will receive predetermined power and the remaining power detected by the remaining power detection apparatus 710 will be, e.g., 10.

Figure 12B:
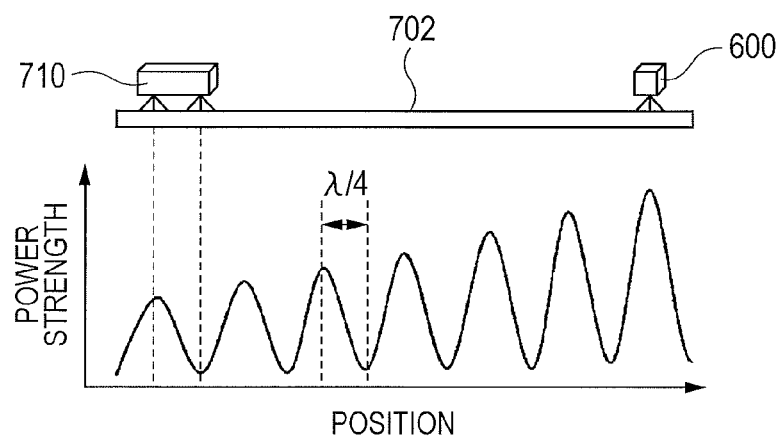
FIGS. 12B(A) and 12B(B) are schematic diagrams showing the strength of power transmitted through a power transmission medium according to the fifth embodiment.
Figure 12B:
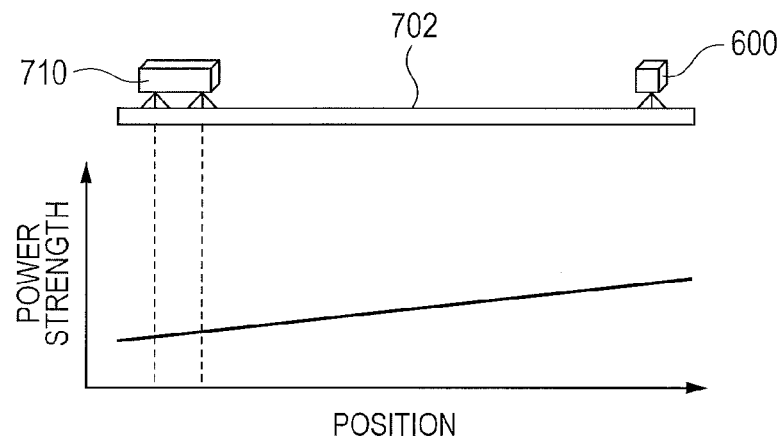

FIGS. 12B(A) and 12B(B) are schematic views showing the strength of power propagating through the power transmission medium 702 in the wireless power transmission system of FIG. 12A. As shown in FIGS. 12B(A) and 12B(B), the strength of power varies depending on the position in the power transmission medium 702. FIG. 12B(A) shows a case where power is reflected by an end surface of the power transmission medium 702. For example, power is reflected when the upper and lower conductors are shorted or opened on the end surface of the power transmission medium 702.

Radio waves emitted by the transmitter 600 and radio waves reflected by the end surface of the power transmission medium 702 interfere with each other, generating standing waves. That is, there occur positions where power is strengthened and positions where power is weakened. The intervals between these positions are one-fourth the wavelength in the power transmission medium 702 of a frequency used for power transmission. Accordingly, the remaining power detection apparatus 710 preferably detects the remaining power at two or more positions on the power transmission medium 702. For example, if antennas for detecting the remaining power are disposed at intervals that are one-fourth the wavelength in the power transmission medium 702 of the frequency used for power transmission, the remaining power can be detected in such a manner that the influence of a standing wave is reduced. That is, the remaining power detection apparatus 710 preferably includes multiple remaining power detection apparatuses disposed in such a manner as to be adjacent to each other at two or more positions at intervals of one-fourth the wavelength.

FIG. 12B(B) shows a case where power is not reflected by the end surface of the power transmission medium 702. Such cases include a case where the upper and lower conductors terminate with a particular impedance at the end surface of the power transmission medium 702 and a case where a radio wave absorber is used. Here, only radio waves emitted by the transmitter 600 are present, generating no standing wave. The remaining power detection apparatus 710 may detect the remaining power at one position on the power transmission medium 702.

The transmitter 600 and the remaining power detection apparatus 710 may be disposed on a side surface or bottom surface of the power transmission medium 702 or combined with the power transmission medium 702. Alternatively, the transmitter 600 and the remaining power detection apparatus 710 may be incorporated into the same apparatus. Two or more remaining power detection apparatuses 710 may be disposed on one power transmission medium 702.

The power transmission medium 702 is not limited to a sheet-shaped one and may be in the form of a cable or have a three-dimensional structure.

Figure 13:
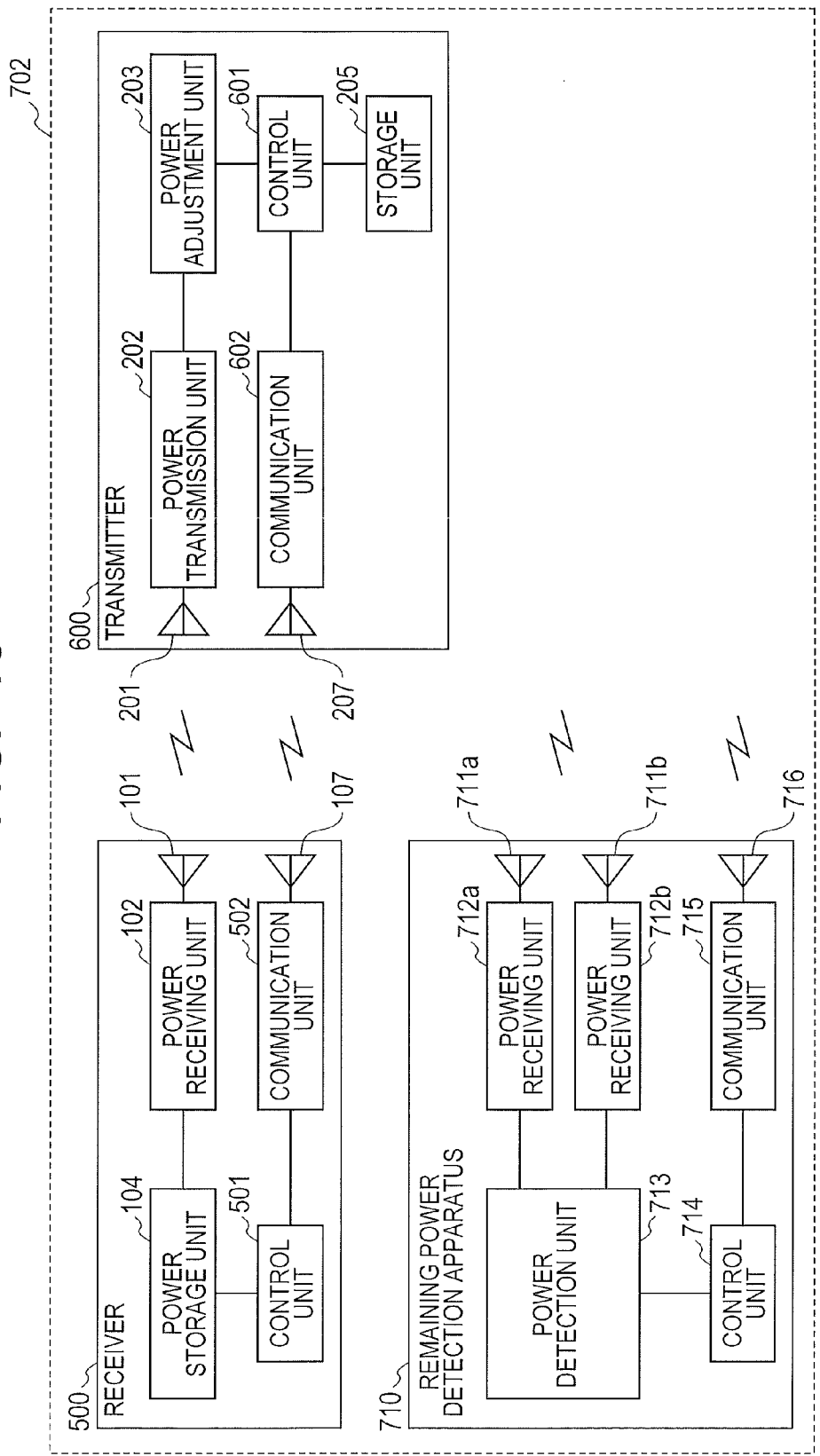
FIG. 13 is a diagram showing an example configuration of the wireless power transmission system according to the fifth embodiment.

FIG. 13 is a diagram showing an example configuration of the wireless power transmission system 1000 according to this embodiment.

The components having the same characters and functions as those shown in FIG. 13 and described above, of a receiver 500 and a transmitter 600 in FIG. 13 will not be described.

The receiver 500 includes the power receiving antenna 101, the power receiving unit 102, the power storage unit 104, a control unit 501, a communication unit 502, and the communication antenna 107.

The transmitter 600 includes the power transmission antenna 201, the power transmission unit 202, the power adjustment unit 203, a control unit 601, the storage unit 205, a communication unit 602, and the communication antenna 207.

The remaining power detection apparatus 710 includes power receiving antennas 711a and 711b, power receiving units 712a and 712b, a power detection unit 713, a control unit 714, a communication unit 715, and a communication antenna 716.

The control unit 501 acquires information about the amount of power stored in the power storage unit 104 and controls the communication unit 502. The communication unit 502 communicates with the transmitter 600 via the communication antenna 107.

The control unit 601 acquires information about the receiver 500 and the remaining power detection apparatus 710 received by the communication unit 602 and controls the power adjustment unit 203.

The power receiving unit 712a receives power transmitted by the transmitter 600 and remaining in the power transmission medium 702 and outputs the power to the power detection unit 713. The power receiving unit 712b receives power transmitted by the transmitter 600 and remaining in the power transmission medium 702 via the power receiving antenna 711b and outputs the power to the power detection unit 713. The power detection unit 713 receives the power and detects the level thereof. The control unit 714 acquires information about the power level detected by the power detection unit 713 and controls the communication unit 715. The communication unit 715 generates a communication signal and communicates the with the transmitter 600 via the communication antenna 716.

The power receiving antennas 711a and 711b and the communication antenna 716 may be any type of antennas such as dipole antennas, patch antennas, coils, electrodes, resonators, or couplers so long as the antennas are interfaces capable of wireless power transmission or wireless communication via the power transmission medium 702. Alternatively, a power receiving antenna 711a or power receiving antenna 711b additionally having the function of the communication antenna 716 may be coupled to the communication unit 715.

If the transmitter 600 and the remaining power detection apparatus 710 are combined, the control unit 601 can acquire the information about the power level detected by the power detection unit 713. This eliminates the need for the control unit 714, the communication unit 715, and the communication antenna 716.

The entire remaining power detection apparatus 710 or some components thereof such as the power receiving antennas 711a and 711b and the power detection unit 713 may be disposed at multiple positions on the power transmission medium 702 so as to detect power remaining in the power transmission medium 702 more correctly. The disposition at multiple positions reduces the possibility that too little or too much remaining power will be detected due to the influence of standing waves or the like in the power transmission medium 702.

Some components of the transmitter 600, such as the power transmission antenna 201, the power transmission unit 202, and the power adjustment unit 203, may be disposed at multiple positions on the power transmission medium 702 so as to transmit power to any position in the power transmission medium 702 or transmit high power. The disposition at multiple positions reduces the possibility that the efficiency of power transmission to the receiver will decrease due to the influence of standing waves or the like in the power transmission medium 702.

While the receiver 500 includes only the power storage unit 104 as a load, an electronic apparatus such as a cellular phone may additionally be coupled to the receiver 500. The receiver 500 may be incorporated into an electronic apparatus such as a cellular phone. Likewise, the transmitter 600 may be incorporated into another electronic apparatus. The power storage unit 104 is, for example, a secondary battery such as a lithium ion battery, or capacitor.

The control unit 601 may store information acquired from the communication unit 206 in the storage unit 205. The storage unit 205 is, for example, a flash memory, hard disk, or SSD.

The units included in the receiver 500 may operate on power stored in the power storage unit 104 or power received by the power receiving unit 102.

Figure 14:
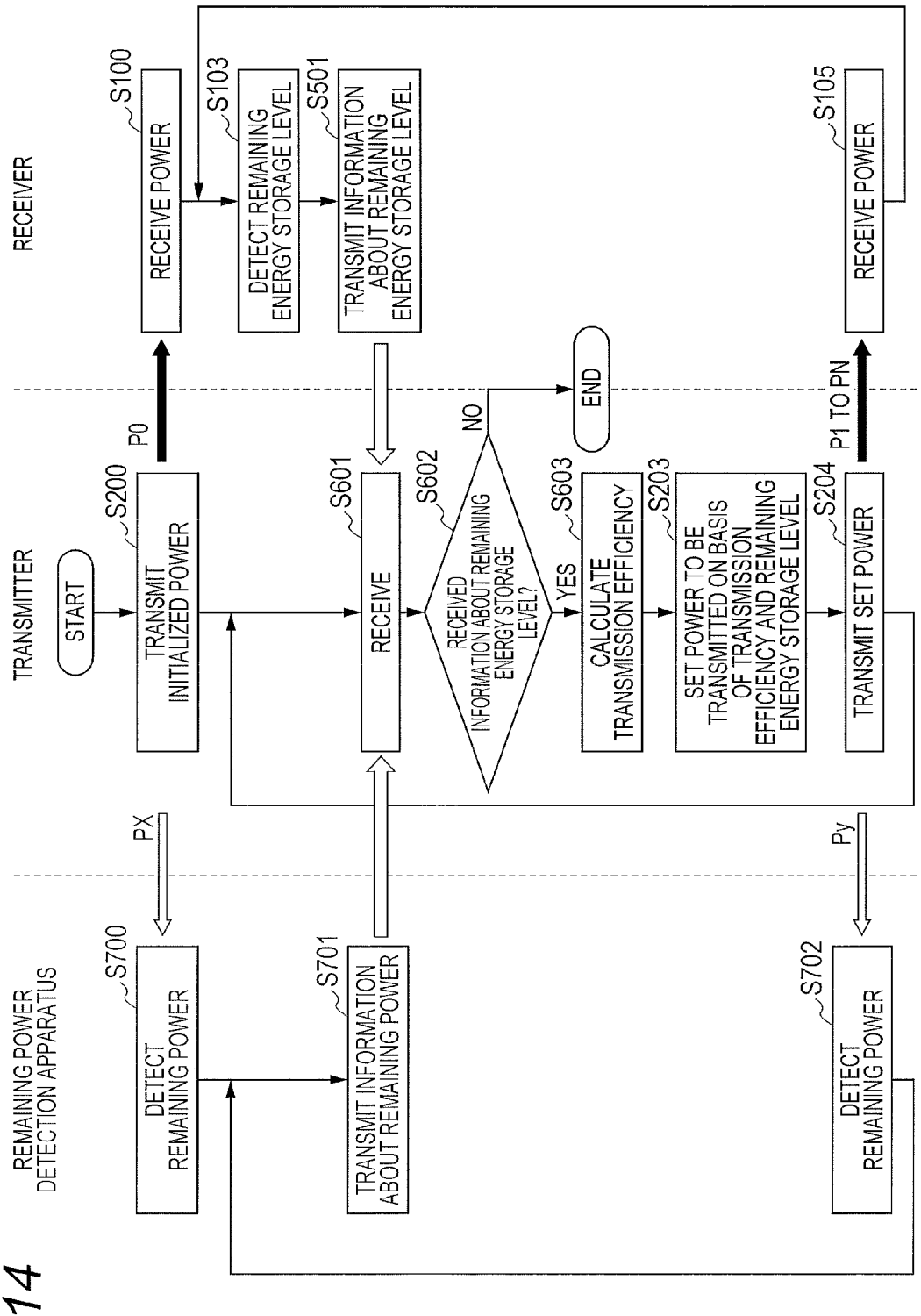
FIG. 14 is a flowchart showing a process performed by a transmitter, a receiver, and a remaining power detection apparatus according to the fifth embodiment.

FIG. 14 is a flowchart showing a process performed by the transmitter, the receiver, and the remaining power detection apparatus according to this embodiment.

The transmitter 600 initializes the power adjustment unit 203 and transmits initialized power from the power transmission unit 202 (S200). The receiver 500 receives the initialized power 5200 at the power receiving unit 102 (S100). Likewise, the remaining power detection apparatus 710 receives power remaining in the power transmission medium 702 at the power receiving unit 712 and detects the level of the power at the power detection unit 713 (S700).

The control unit 501 then detects the amount of power stored in the power storage unit 104 (S103) and transmits information about the remaining energy storage level from the communication unit 502 to the transmitter 600 (S501). Likewise, the control unit 714 transmits information about the amount of remaining power detected by the power detection unit 713 from the communication unit 715 to the transmitter 600 (S701).

The transmitter 600 receives the information about the remaining power at the communication unit 602 (S601), receives the information about the remaining energy storage level at the communication unit 602 (S602), and calculates the transmission efficiency at the control unit 601 (S603).

The power remaining in the power transmission medium 702 detected by the power detection unit 713 can be considered as corresponding to a value obtained by subtracting the power received by the receiver 500 (and no-load power loss) from the power to be transmitted (P0 to PN) by the transmitter 600. Accordingly, by replacing the remaining power with the power received by the receiver 500, the transmission efficiency can be calculated as in the first embodiment.

Based on the transmission efficiency and the remaining energy storage level thus obtained, the control unit 601 sets power to be transmitted using the tables and expressions stored in the storage unit 205 (S203). The power to be transmitted may be set using the amplitude of a power transmission signal or the ratio between the power transmission time and the power transmission stop time. The control unit 601 then controls the power adjustment unit 203 and transmits the set power from the power transmission unit 202 (S204).

The receiver 500 then receives the transmitted power at the power receiving unit 102 (S105). Likewise, the remaining power detection apparatus 710 receives power remaining in the power transmission medium 702 at the power receiving unit 712 and detects the level of the power at the power detection unit 713 (S702). Thereafter, the energy storage level detection step S103 and later steps are repeated.

As described above, the wireless power transmission system according to this embodiment adjusts the power to be transmitted by the transmitter on the basis of the power transmission efficiency and the amount of power stored in the receiver without acquiring information about the received power from the receiver. The system thus can realize efficient power transmission. Further, the wireless power transmission system can reduce the risk that the amount of power stored in the receiver will decrease too much.

Since there is no need to acquire information about the received power from the receiver, the configuration of the receiver is simplified. Further, the amount of communication between the receiver and the transmitter is reduced.

When the transmission efficiency is high, the remaining energy storage level is low; when the transmission efficiency is low, the remaining energy storage level is high. Accordingly, power to be transmitted may be controlled so that the amount of remaining power is kept constant. The setting of power to be transmitted is simplified in this way.

Alternatively, as in the second embodiment, power to be transmitted may be adjusted on the basis of the present and past power transmission efficiency. Alternatively, as in the third embodiment, power to be transmitted may be adjusted on the basis of the power transmission efficiency, the amount of power stored in the receiver, and the power consumption of the receiver.

In FIG. 12A, the remaining power detection apparatus 710 may be omitted; the receiver 500 and the transmitter 600 on the power transmission medium 702 may have the function of transmitting or receiving power and information and calculating power to be transmitted on the basis of the power transmission efficiency, the amount of power stored in the receiver, or the like; and the receiver or transmitter may adjust power to be transmitted.

Sixth Embodiment

A wireless power transmission system, a transmitter, and a receiver according to a sixth embodiment of the present invention will be described with reference to FIGS. 15 to 17. In the wireless power transmission system 1000 according to this embodiment, multiple receivers are present on the power transmission medium 702, and the power to be transmitted by the transmitter is adjusted on the basis of the power transmission efficiency and the amounts of power stored in the receivers without acquiring information about received power from the receivers.

Figure 15:
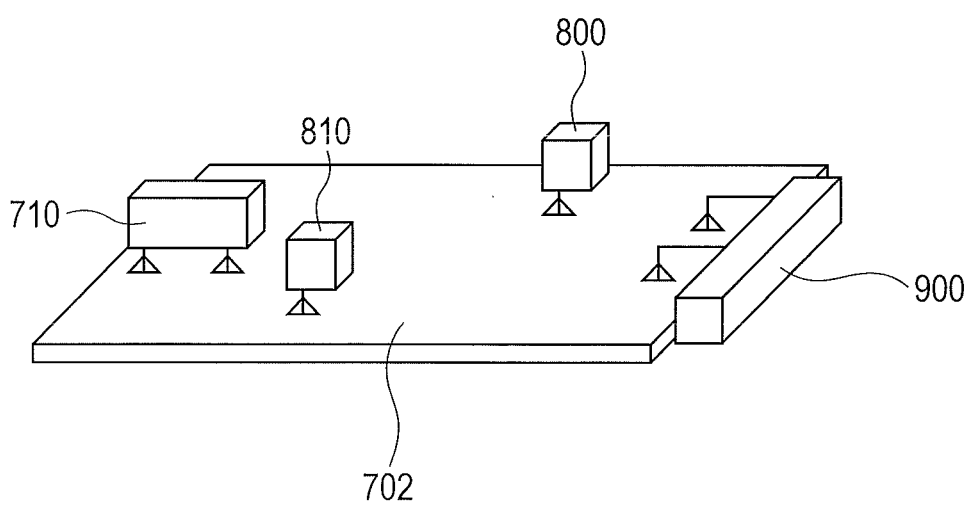
FIG. 15 is an external perspective view schematically showing the apparatus configuration of a wireless power transmission system according to a sixth embodiment of the present invention.

FIG. 15 is an external perspective view schematically showing the wireless power transmission system according to this embodiment. The power transmission medium 702 and the remaining power detection apparatus 710 of FIG. 15 have been described in the fifth embodiment with reference to FIG. 12 and will not be described.

A transmitter 900, receivers 800 and 810, and the remaining power detection apparatus 710 are all disposed on the power transmission medium 702. The transmitter 900 transmits power to the receivers 800 and 810 via the power transmission medium 702.

The transmitter 900 may have multiple power transmission antennas. Multiple transmitters 900 may be disposed. Each power to be transmitted by these transmitters is preferably controlled on the basis of the positions of the receivers 800 and 810. Alternatively, the transmitter 900 and the remaining power detection apparatus 710 may be disposed on a side surface or the bottom surface of the power transmission medium 702 or combined with the power transmission medium 702. Alternatively, the transmitter 900 and the remaining power detection apparatus 710 may be incorporated into the same apparatus.

Figure 16:
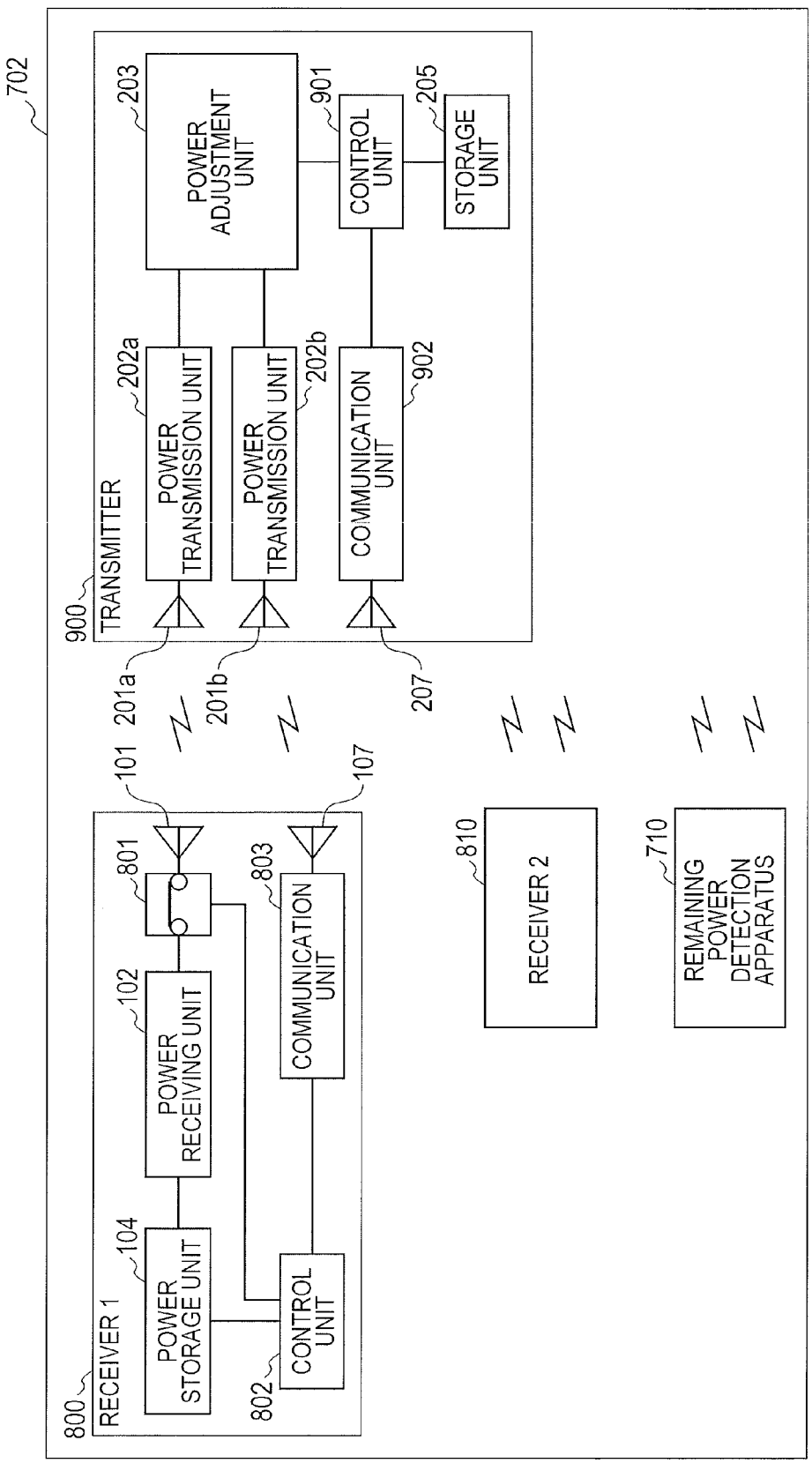
FIG. 16 is a diagram showing an example configuration of the wireless power transmission system according to the sixth embodiment.

FIG. 16 is a diagram showing an example configuration of the wireless power transmission system according to this embodiment.

The components having the same characters and functions as those shown in FIG. 1 and described above, of a receiver 800 and a transmitter 900 in FIG. 16 will not be described. Since the receivers 800 and 810 have the same configuration, the receiver 810 will not be described. The remaining power detection apparatus 710 has been described with reference to FIG. 13 and will not be described.

The receiver 800 includes the power receiving antenna 101, a power receiving switch 801, the power receiving unit 102, the power storage unit 104, a control unit 802, a communication unit 803, and the communication antenna 107.

The transmitter 900 includes power transmission antennas 201a and 201b, power transmission units 202a and 202b, the power adjustment unit 203, a control unit 901, the storage unit 205, a communication unit 902, and the communication antenna 207.

The control unit 802 receives an instruction about the control of the amount of received power from the transmitter 900 via the communication unit 803. In accordance with the instruction, the control unit 802 controls the power receiving switch 801. The control unit 802 also acquires information about the amount of power stored in the power storage unit 104 and controls the communication unit 803. The communication unit 803 communicates with the transmitter 900 via the communication antenna 107.

The control unit 901 acquires the information about the receivers 800 and 810 and the remaining power detection apparatus 710 received by the communication unit 902 and information about the storage unit 205 and communicates with the receivers 800 and 810 via the communication unit 902 in order to instruct the receivers 800 and 810 to control power reception. The control unit 901 also sets power by controlling the power adjustment unit 203 and transmits the set power.

Some components of the transmitter 900, such as the power transmission antennas 201a and 201b, the power transmission units 202a and 202b, and the power adjustment unit 203, may be disposed at multiple positions on the power transmission medium 702 so as to transmit power to any position in the power transmission medium 702 or transmit high power. The disposition at multiple positions reduces the possibility that the efficiency of power transmission to the receivers will decrease due to the influence of standing waves or the like in the power transmission medium 702.

The power receiving switch 801 may be a switch that couples or decouples the power receiving antenna 101 and the power receiving unit 102 or may function as an impedance adjustment unit for adjusting the impedance of the power receiving antenna 101 or power receiving unit 102 or as a power receiving antenna position adjustment unit for moving the power receiving antenna 101 away from the power transmission medium 702.

While the receiver 800 includes only the power storage unit 104 as a load, an electronic apparatus such as a cellular phone may additionally be coupled to the receiver 800. The receiver 800 may be incorporated into an electronic apparatus such as a cellular phone. Likewise, the transmitter 900 may be incorporated into another electronic apparatus. The power storage unit 104 is, for example, a secondary battery such as a lithium ion battery, or capacitor.

The control unit 901 may store information acquired from the communication unit 206 in the storage unit 205. The storage unit 205 is, for example, a flash memory, hard disk, or SSD.

The units included in the receiver 800 may operate on power stored in the power storage unit 104 or power received by the power receiving unit 102.

Figure 17:
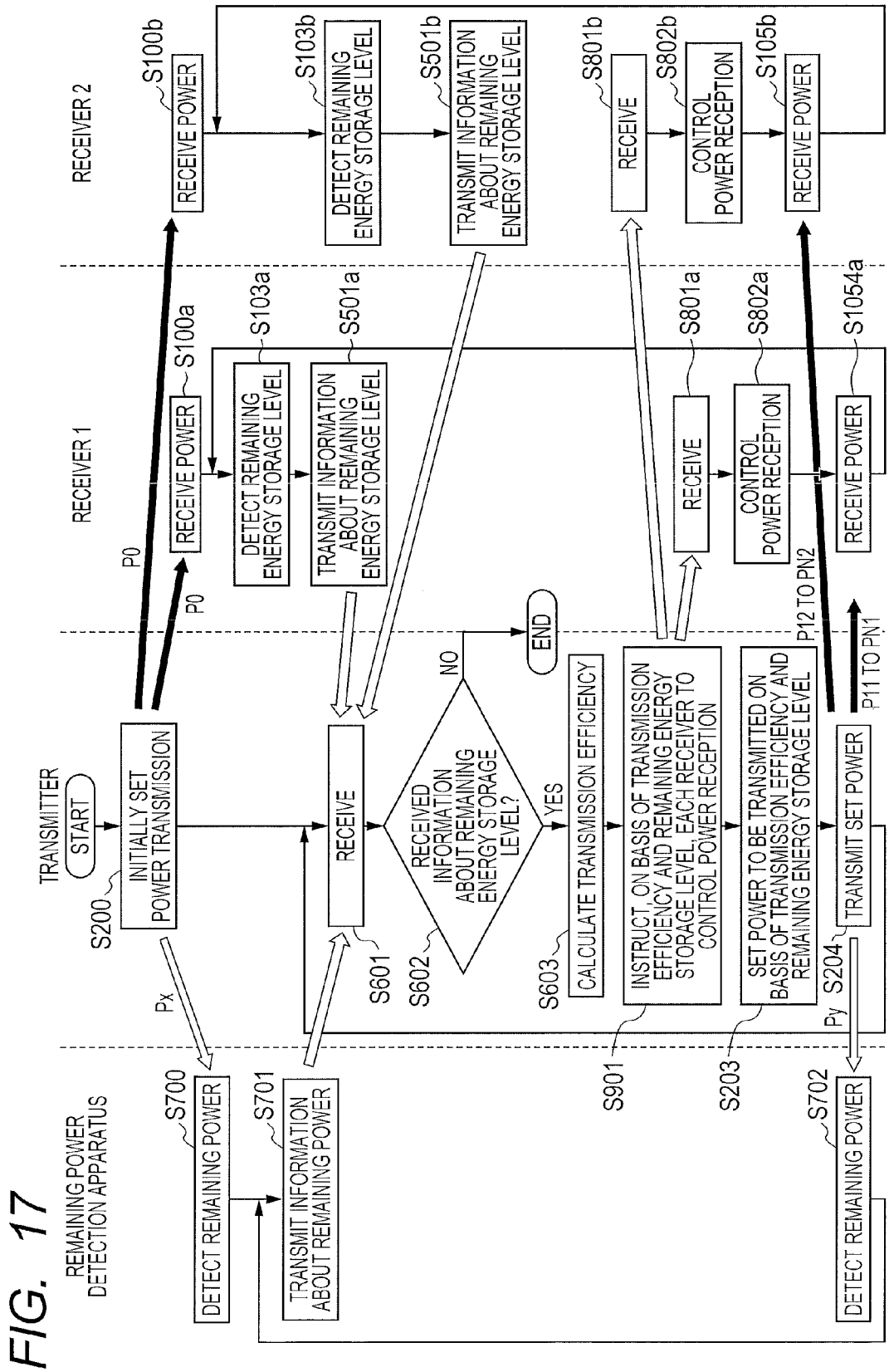
FIG. 17 is a flowchart showing a process performed by a transmitter, receivers, and a remaining power detection apparatus according to the sixth embodiment.

FIG. 17 is a flowchart showing a process performed by the transmitter, the receiver, and the remaining power detection apparatus according to this embodiment.

The transmitter 900 initializes the power adjustment unit 203 and transmits initialized power (P0) from the power transmission unit 202 (S200). The receiver 800 receives the initialized power 5200 at the power receiving unit 102 (S100a). Likewise, the power receiving switch 801 receives the initialized power 5200 (S100b). The remaining power detection apparatus 710 receives power Px remaining in the power transmission medium 702 at the power receiving unit 712 and detects the level of the power at the power detection unit 713 (S700).

The control unit 802 then detects the amount of power stored in the power storage unit 104 (S103a) and transmits information about the remaining energy storage level from the communication unit 502 to the transmitter 900 (S501a). Likewise, the power receiving switch 801 detects the remaining energy storage level (S103b) and transmits information about the remaining energy storage level to the transmitter 900 (S501b). The control unit 714 transmits information about the remaining power detected by the power detection unit 713 from the communication unit 715 to the transmitter 600 (S701).

When the transmitter 900 receives the information about the remaining power at the communication unit 902 (S601) and receives the information about the remaining energy storage level at the communication unit 902 (S602), the control unit 901 calculates the transmission efficiency (S603), determines the power reception control of the receivers 800 and 810 on the basis of the transmission efficiency and the remaining power using the tables and the expressions stored in the storage unit 205, and transmits the details of the power reception control from the communication unit 902 to the receivers 800 and 810 (S901).

The receiver 800 receives the power reception control instruction at the communication unit 803 (S801a), and the control unit 802 controls the power receiving switch 801 in accordance with the received instruction (S802a). Likewise, the receiver 810 receives the power reception control instruction (S801b) and controls power reception (S802b).

The transmitter 900 then sets power to be transmitted at the control unit 901 on the basis of the transmission efficiency and the remaining energy storage level (S203). The power to be transmitted may be set using the amplitude of a power transmission signal or the ratio between the power transmission time and the power transmission stop time. The control unit 901 then controls the power adjustment unit 203 and transmits the set power (P11, P12) from the power transmission unit 202 (S204).

The receiver 800 then receives the transmitted power at the power receiving unit 102 (S105a). Likewise, the power receiving switch 801 receives the transmitted power (S105b). The remaining power detection apparatus 710 receives power Py remaining in the power transmission medium 702 at the power receiving unit 712 and detects the level of the power at the power detection unit 713 (S702). Thereafter, the energy storage level detection step S103a and later steps are repeated. The power transmission unit 202 then transmits the set power (PN1, PN2) (S204).

As described above, even when multiple receivers are present, the wireless power transmission system according to this embodiment adjusts the power to be transmitted by the transmitter on the basis of the power transmission efficiency and the amounts of power (Px, Py) stored in the receivers without acquiring information about the received power from the receivers. Thus, power can be transmitted efficiently to any receiver. The wireless power transmission system also can reduce the risk that the amount of power stored in the receiver will decrease too much.

Since there is no need to acquire information about the received power from the receivers, the configuration of the receivers is simplified. Further, the amount of communication between the receivers and the transmitter is reduced.

Further, even when there exist both a receiver requiring high power and a receiver requiring low power, the required power can be transmitted to the respective receivers by instructing the receivers to control power reception. Further, the risk that high power will be supplied to the receiver requiring low power, which will then be destroyed, can be avoided.

Meanwhile, if a receiver requiring power is surrounded by other receivers, the surrounding other receivers may receive power, so that power cannot be transmitted to the receiver requiring power. However, the wireless power transmission system according to this embodiment allows power to be transmitted to the receiver requiring power, by instructing the surrounding other receivers to control power reception.

When the transmission efficiency is high, the remaining energy storage level is low; when the transmission efficiency is low, the remaining energy storage level is high. Accordingly, power to be transmitted may be controlled so that the amount of remaining power is kept constant. The setting of power to be transmitted is simplified in this way.

Alternatively, as in the second embodiment, power to be transmitted may be adjusted on the basis of the present and past power transmission efficiency. Alternatively, as in the third embodiment, power to be transmitted may be adjusted on the basis of the power transmission efficiency, the amount of power stored in the receiver, the power consumption of the receiver.

The present invention can be applied to systems where multiple receivers and multiple transmitters are disposed on one power transmission medium 702. In this case, each receiver can receive power from a transmitter located on a side where the power transmission efficiency is higher. Also in this example, power to be transmitted to a receiver by a transmitter is adjusted on the basis of the power transmission efficiency and the amount of power stored in the receiver.

The present invention is not limited to the above-mentioned embodiments and includes various modifications. For example, although the embodiments have been described in detail to clarify the present invention, the invention should not be construed as always including all the described components. Further, some components of an embodiment can be replaced with components of another embodiment, and an embodiment can additionally include components of another embodiment. Further, with respect to some components of each embodiment, other components can be added, deleted, or replaced.

Part or all of the above-mentioned components, functions, processing units, processing means, and the like may be realized as hardware, for example, by designing these using integrated circuits. Alternatively, the above-mentioned components, the functions, and the like may be realized as software by allowing a processor to interpret and execute a program for realizing the respective functions. Information such as the program for realizing the functions, tables, and files can be stored in a storage device such as a memory, hard disk, or solid state drive (SSD), or a storage medium such as an IC card, SD card, or DVD.

The drawings show only control lines and information lines considered necessary for description and do not necessarily show all of the control lines and information lines of the product. It can be considered that almost all the components are actually coupled to each other.

What is claimed is:

1. A wireless power transmission system comprising:
   a receiver; and
   a transmitter that wirelessly transmits power to the receiver,
   wherein the transmitter includes:
      a power transmission unit that transmits power; and
      a power adjustment unit that adjusts power to be transmitted by the transmitter,
   wherein the receiver includes:
      a power receiving unit that receives the power from the transmitter; and
      a power storage unit that stores the received power,
   wherein the magnitude of the power to be transmitted is adjusted as a function of both a transmission efficiency of the power transmitted to the receiver by the transmitter and a remaining level of energy stored in the power storage unit,
   wherein the power to be transmitted increases as the transmission efficiency increases, and
   wherein the power to be transmitted increases as the remaining level of energy stored in the power storage unit decreases.

2. The wireless power transmission system according to claim 1,
   wherein the transmission efficiency is calculated on the basis of transmission efficiency histories, and
   wherein the power to be transmitted is adjusted so that a threshold for increasing the power to be transmitted is made higher as the incidence of high transmission efficiency in the transmission efficiency histories is higher.

3. The wireless power transmission system according to claim 1,
   wherein the power consumption of the receiver is calculated, and
   wherein the power to be transmitted by the transmitter is adjusted so that the power to be transmitted is made higher when the power consumption is higher than when the power consumption is lower.

4. The wireless power transmission system according to claim 1, further comprising:
   a power transmission medium that transmits power; and
   a remaining power detection device that detects power remaining in the power transmission medium,
   wherein the power transmission medium includes:
      a dielectric; and
      a pair of conductors disposed on top and bottom surfaces of the dielectric with the dielectric between the conductors,
   wherein the transmitter transmits power to the receiver via the power transmission medium, and
   wherein the transmission efficiency is calculated on the basis of the power remaining in the power transmission medium and the amount of the power stored in the power storage unit.

5. The wireless power transmission system according to claim 4,
   wherein the receiver comprises a received power amount adjustment unit, and
   wherein the received power amount adjustment unit is controlled on the basis of the transmission efficiency and the amount of the stored power.

6. The wireless power transmission system according to claim 1, wherein the magnitude of the power to be transmitted is adjusted by adjusting the amplitude of a power transmission signal or by adjusting a power transmission time.

7. The wireless power transmission system according to claim 1,
   wherein the receiver transmits information about the received power to the transmitter, and
   wherein the transmitter receives the information and calculates the transmission efficiency.

8. The wireless power transmission system according to claim 1,
   wherein the transmitter transmits information about the power to be transmitted to the receiver, and
   wherein the receiver receives the information and calculates the transmission efficiency.

9. The wireless power transmission system according to claim 4,
   wherein the pair of conductors are shorted or opened at an end surface of the power transmission medium,
   wherein the remaining power detection device is disposed at a plurality of positions on the power transmission medium, and
   wherein intervals at which the remaining power detection devices are disposed are one-fourth a wavelength in the power transmission medium of a frequency for power transmission.

10. The wireless power transmission system according to claim 4,
    wherein the power transmission medium has a structure where power is not reflected by an end surface thereof, and
    wherein the remaining power detection device is disposed at one position on the power transmission medium.

11. The wireless power transmission system according to claim 4,
    wherein the transmitter comprising at least one transmitter, the receiver comprising a plurality of receivers, and the remaining power detection device comprising at least one remaining power detection device are coupled to the power transmission medium, and wherein the transmission efficiency of the power transmitted to the respective receivers and the power to be transmitted to the receivers are calculated on the basis of the power remaining in the power transmission medium and the amounts of power remaining in the power storage units of the respective receivers.

12. A transmitter comprising:
a power transmission unit that wirelessly transmits power to a receiver;
a power adjustment unit that adjusts power to be transmitted;
a communication unit that wirelessly communicates with the receiver; and
a control unit,
wherein information about power received by the receiver and information about an amount of power stored in the receiver are acquired from the receiver,
wherein a transmission efficiency of the transmitted power is calculated, and
wherein the magnitude of the power to be transmitted is adjusted as a function of both the transmission efficiency and a remaining level of energy stored in the receiver,
wherein the power to be transmitted increases as the transmission efficiency increases, and
wherein the power to be transmitted increases as the remaining level of energy stored in the receiver decreases.

13. The transmitter according to claim 12,
wherein the transmission efficiency is calculated on the basis of transmission efficiency histories, and
wherein the power to be transmitted is adjusted so that a threshold for increasing the power to be transmitted is made higher as the incidence of high transmission efficiency in the transmission efficiency histories is higher.

14. The transmitter according to claim 12,
wherein the transmitter is coupled to a power transmission medium that transmits power,
wherein the power transmission medium includes:
a dielectric; and
a pair of conductors disposed on top and bottom surfaces of the dielectric with the dielectric between the conductors,
wherein the transmitter transmits power to the receiver via the power transmission medium, and
wherein the transmitter calculates the transmission efficiency on the basis of information about power remaining in the power transmission medium and the amount of the power stored in the receiver.

15. The transmitter according to claim 14,
wherein the transmitter adjusts the power to be transmitted by instructing, on the basis of the transmission efficiency and the amount of the stored power, the receiver to control power reception.

16. A receiver comprising:
a power receiving unit that wirelessly receives power from a transmitter;
a power detection unit that detects the received power;
a power storage unit that stores the received power;
a communication unit that wirelessly communicates with the transmitter; and
a control unit,
wherein, upon receipt of an instruction to perform power reception control from the transmitter, the receiver performs the power reception control, and
wherein the receiver adjusts the amount of power to be received as a function of both a transmission efficiency of the power and a remaining level of energy stored in the power storage unit, the transmission efficiency being a ratio between the power transmitted by the transmitter and the power received by the power receiving unit,
wherein the power to be transmitted increases as the transmission efficiency increases, and
wherein the power to be transmitted increases as the remaining level of energy stored in the power storage unit decreases.

17. The receiver according to claim 16, wherein the receiver sets required power on the basis of the transmission efficiency of the power received from the transmitter and the amount of power stored in the power storage unit and transmits information about the required power to the transmitter.

18. The transmitter according to claim 16,
wherein the receiver is coupled to a power transmission medium that transmits power,
wherein the power transmission medium includes:
a dielectric; and
a pair of conductors disposed on top and bottom surfaces of the dielectric with the dielectric between the conductors,
wherein the receiver receives power from the transmitter via the power transmission medium, and
wherein the receiver calculates the transmission efficiency on the basis of information about power remaining in the power transmission medium and the amount of the power stored in the power storage unit.

* * * * *